United States Patent
Yamahara et al.

(12)

(10) Patent No.: US 6,839,110 B1
(45) Date of Patent: Jan. 4, 2005

(54) LIQUID CRYSTAL DISPLAY DEVICE INCORPORATING PHASE DIFFERENCE PLATE AND LIQUID CRYSTAL LAYER CAPABLE OF IMPROVING VIEWING ANGLE DEPENDENCE

(75) Inventors: Motohiro Yamahara, Osaka (JP); Shigeaki Mizushima, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/997,219

(22) Filed: Dec. 23, 1997

(30) Foreign Application Priority Data

Dec. 25, 1996 (JP) .............................................. 8-346035
Dec. 25, 1996 (JP) .............................................. 8-346046

(51) Int. Cl.⁷ .......................................... G02F 1/1335
(52) U.S. Cl. ..................................... 349/118; 349/181
(58) Field of Search ................................ 349/170, 181, 349/120, 118, 114

(56) References Cited

U.S. PATENT DOCUMENTS

| | | | | |
|---|---|---|---|---|
| 5,343,317 A | * | 8/1994 | Wada et al. ................. | 349/119 |
| 5,369,513 A | | 11/1994 | Akatsuka et al. ............ | 359/73 |
| 5,375,006 A | * | 12/1994 | Haas .......................... | 349/118 |
| 5,406,396 A | | 4/1995 | Akatsuka et al. ............ | 359/73 |
| 5,506,706 A | | 4/1996 | Yamahara et al. ........... | 359/73 |
| 5,559,618 A | * | 9/1996 | Mori ........................... | 349/117 |
| 5,583,679 A | * | 12/1996 | Ito et al. ...................... | 349/118 |
| 5,646,703 A | * | 7/1997 | Kamada et al. ............. | 349/118 |
| 5,739,881 A | * | 4/1998 | Xu et al. ..................... | 349/118 |
| 5,760,859 A | * | 6/1998 | Bosma et al. ................ | 349/75 |
| 5,805,253 A | * | 9/1998 | Mori et al. .................. | 349/118 |
| 5,867,239 A | * | 2/1999 | Sahouani et al. ........... | 349/117 |
| 6,057,901 A | * | 5/2000 | Xu .............................. | 349/121 |

FOREIGN PATENT DOCUMENTS

| | | |
|---|---|---|
| JP | 55-600 | 1/1980 |
| JP | 56-97318 | 8/1981 |
| JP | 05-059365 | 3/1993 |
| JP | 05-215912 | 8/1993 |
| JP | 05-313159 | 11/1993 |
| JP | 06-075116 | 3/1994 |
| JP | 06/167706 | 6/1994 |
| JP | 08-101381 | 4/1996 |
| JP | 08-152514 | 6/1996 |

OTHER PUBLICATIONS

Ong, "Negative Birefringence film compensated multidomain TN–LCD with improved symmetrical optical performance", SID 1993.*

(List continued on next page.)

Primary Examiner—Kenneth Parker
(74) Attorney, Agent, or Firm—David G. Conlin; David A. Tucker; Edwards & Angell, LLP

(57) ABSTRACT

A liquid crystal display device incorporates two phase difference plates stacked together and disposed between a liquid crystal display element and a pair of polarizers, the liquid crystal display element being formed by sandwiching a liquid crystal layer between a pair of electrode substrates, and the polarizers being disposed on one side of the liquid crystal display element. Since the principal refractive indices $n_a$, $n_b$, and $n_c$ of the phase difference plates are such that $n_a < n_b < n_c$, the phase difference plates exhibit positive refractive index anisotropies. The principal refractive index $n_b$ inclines to the normal to the surfaces of the phase difference plates about one of the principal refractive indices $n_a$ or $n_c$ that is parallel to the surfaces. In addition, the refractive index anisotropy an of the liquid crystal material constituting the liquid crystal layer is specified to vary with wavelengths of rays of light within a range that allows no viewing-angle dependent coloration to occur on a liquid crystal screen. This eliminates viewing-angle dependent phase differences that, otherwise, would occur to the liquid crystal display element, and especially prevents the coloring phenomenon efficiently on the liquid crystal screen that, otherwise, would, occur with larger viewing angles.

20 Claims, 16 Drawing Sheets

OTHER PUBLICATIONS

Bos, "Passive optical phase retarders for liquid crystal displays", SID IDRC 1994.*

Herke, " LCD Modeling ads a display Characterization Tool", SID 1995.*

Wu, "Phase –Matched Compensation Films for Liquid Crystal Displays", Materials, Chemicals and Physics, 42 (1995) 163–168.*

Wu, Phase Matched Biaxial Compenstion Film for LCDs, Proceedings of the SID, May 1995.*

Nishimura et al, The Performance of a Liquid Crystal Polymer Film as an Optical Compensator for a fast response STN–LCD, May 1995.*

* cited by examiner

LIQUID CRYSTAL DISPLAY DEVICE INCORPORATING PHASE DIFFERENCE PLATE AND LIQUID CRYSTAL LAYER CAPABLE OF IMPROVING VIEWING ANGLE DEPENDENCE

FIELD OF THE INVENTION

The present invention relates to a liquid crystal display device having a display screen with viewing-angle characteristics improved by a phase difference plate combined with a liquid crystal display element.

BACKGROUND OF THE INVENTION

Liquid crystal display devices using nematic liquid crystal display elements, which have conventionally been widely used as numeric-value-segment-type display devices such as watches and portable calculators, have recently been also used in word processors, note-type personal computers, car-use liquid crystal televisions, and other apparatuses.

Generally, a liquid crystal display element has a light-transmitting substrate and electrode lines for turning on and off pixels and other components that are formed on the substrate. For example, in an active-matrix liquid crystal display device, active elements, such as thin-film transistors, are formed on the substrate together with the electrode lines as switching means for selectively driving pixel electrodes by which voltages are applied across the liquid crystal. Further, in liquid crystal display devices capable of color display, color filter layers having colors such as red, green and blue are provided on the substrate.

Liquid crystal display elements such as that mentioned above adopt a liquid crystal display mode that is suitably selected depending on twist angles of the liquid crystal: some of well-known modes are active-driving-type twisted nematic liquid crystal display mode (hereinafter, referred to as the TN mode) and the multiplex-driving-type super-twisted nematic liquid crystal display mode (hereinafter, referred to as the STN mode).

The TN mode displays images by orienting the nematic liquid crystal molecules to a 90°-twisted state so as to direct rays along the twisted directions. The STN mode utilizes the fact that the transmittance is allowed to change abruptly in the vicinity of the threshold value of the applied voltage across the liquid crystal by expanding the twist angle of the nematic liquid crystal molecules to not less than 90°.

The problem with the STN mode is that the background of the display screen sustains a peculiar color due to interference between colors because of the use of the birefringence effect of liquid crystal. In order to solve this problem and to provide a proper black-and-white display in the STN mode, the application of an optical-retardation compensation plate is considered to be effective. Display modes using the optical-retardation compensation plate are mainly classified into two modes, that is, the double layered super-twisted nematic optical-retardation compensation mode (hereinafter, referred to as the DSTN mode) and the film-type optical-retardation compensation mode (hereinafter, referred to as the film-addition mode) wherein a film having optical anisotropy is provided.

The DSTN mode uses a two-layered construction that has display-use liquid crystal cells and liquid crystal cells which are oriented with a twist angle in a direction reversed to that of the display-use liquid crystal cells. The film-addition mode uses a construction wherein films having optical anisotropy are placed. Here, the film-addition mode has been considered to be more prospective on the standpoint of light weight and low costs. Since the application of such an optical-retardation compensation mode makes it possible to improve the black-and-white display characteristics, color STN liquid crystal display devices, which enable color display by installing color-filter layers in STN-mode display devices, have been achieved.

The TN modes are, on the other hand, classified into the normally black mode and the normally white mode. In the normally black mode, a pair of polarization plates are placed with their polarizing directions in parallel with each other, and a black display is provided in a state where no on-voltage is applied across the liquid crystal layer (off-state). In the normally white mode, a pair of polarization plates are placed with their polarizing directions orthogonal to each other, and a white display is provided in the off-state. Here, the normally white mode is considered to be more prospective from the standpoints of display contrast, color reproducibility, viewing-angle dependence, etc.

However, in the TN-mode liquid crystal display devices, the liquid crystal molecules have a refractive index anisotropy $\Delta n$, and are oriented so as to incline to the two substrates that are disposed opposite to each other. For these reasons, the viewing-angle dependence increases: i.e., the contrast of displayed images varies depending upon the direction and angle of the viewer.

FIG. 17 schematically shows the cross-sectional construction of a TN liquid crystal display element 41. As a result of application of a voltage for half-tone display, liquid crystal molecules 42 shown in FIG. 17 slants upward slightly. In such a liquid crystal display element 41, a linearly polarized ray 45 passing through the surfaces of a pair of substrates 43 and 44 along the normals thereto, and linearly polarized rays 46 and 47 passing through those surfaces not along the normals thereto cross the liquid crystal molecules 42 at different angles. Besides, the liquid crystal molecules 42 have a refractive index anisotropy $\Delta n$. Therefore, the linearly polarized rays 45, 46 and 47, upon passing through the liquid crystal molecules 42 in different directions, produce ordinary and extraordinary rays. The linearly polarized rays 45, 46 and 47 are converted to elliptically polarized rays according to the phase difference between the ordinary and extraordinary rays, which cause the viewing-angle dependence.

In addition, in an actual liquid crystal layer, the liquid crystal molecules 42 show different tilt angles in the vicinity of the midpoint between the substrates 43 and 44 and in the vicinities of the substrates 43 and 44. The liquid crystal molecules 42 near the substrate 43 and those near the substrate 44 are twisted by 90° about the normal.

For those reasons described so far, the linearly polarized rays 45, 46 and 47 passing through the liquid crystal layer are affected by the birefringence effect in various ways depending upon, for example, the direction and the angle thereof, resulting in complex viewing-angle dependence.

Such viewing-angle dependence can be observed, as examples, in the following situations. If the viewing angle increases from the normal to the display screen in the standard viewing direction, i.e. downward, and exceeds a certain angle, the displayed image has a distinct color (hereinafter, referred to as the coloration phenomenon), or is reversed in black and white (hereinafter, referred to as the reversion phenomenon) If the viewing angle increases from the normal in the opposite viewing direction, i.e. upward, the contrast decreases abruptly.

The aforementioned liquid crystal display device has another problem that the effectual range of viewing angle narrows with a larger display screen. When a large liquid crystal display device is viewed from a short distance in the front thereof, the same color may appear different in the uppermost and lowermost parts of the large screen due to the effect of the viewing-angle dependence. This is caused by a wider range of viewing angle required to encompass the whole screen surface, which is equivalent to a viewing direction which is increasingly far off-center.

To restrain the viewing-angle dependence, Japanese Laid-Open Patent Applications No. 55-600/1980 (Tokukaisho 55-600) and No. 56-97318/1981 (Tokukaisho 56-97318) suggest that a phase difference plate (phase difference film) be inserted as an optical element having optical anisotropy between the liquid crystal display element and one of the polarization plates. According to the method, the elliptically polarized ray converted from a linearly polarized ray by passage through liquid crystal molecules having refractive index anisotropy is passed through the phase difference plate(s) disposed on the side(s) of the liquid crystal layer having refractive index anisotropy. Hence, the phase difference between the ordinary and extraordinary rays are compensated for for all viewing angles, and the elliptically polarized ray is converted back to the linearly polarized ray, which enables the restraint of the viewing-angle dependence.

Japanese Laid-Open Patent Application No. 5-313159/1993 (Tokukaihei 5-313159), as an example, discloses a phase difference plate of the above kind represented by a refractive index ellipsoid with one of the principal refractive indices parallel to the normal to the surfaces of the phase difference plate. Nevertheless, this phase difference plate still cannot satisfactorily restrain the reversion phenomenon that occurs when the viewing angle increases in the standard viewing direction.

To solve the problem, Japanese Laid-Open Patent Application No. 6-75116/1994 (Tokukaihei 6-75116, corresponding to U.S. Pat. No. 5,506,706) suggests the use of a phase difference plate represented by a refractive index ellipsoid with the principal refractive indices inclining to the normal to the surfaces of the phase difference plate. This method adopts two kinds of phase difference plates as follows.

One of the phase difference plates can be represented by such a refractive index ellipsoid that the smallest of the three principal refractive indices is parallel to the surfaces, one of the larger principal refractive indices inclines to the surfaces of the phase difference plate by an angle θ, the remaining principal refractive index inclines to the normal to the phase difference plate by the same angle θ, and the angle θ satisfies 20°≦θ≦70°.

The other phase difference plate can be represented, in terms of the refractive index anisotropy thereof, by a refractive index ellipsoid inclining to the surfaces thereof. To be more specific, the phase difference plate is such that the three principal refractive indices $n_a$, $n_b$, and $n_c$ of the refractive index ellipsoid satisfy $n_a < n_c < n_b$, and that the principal refractive index $n_b$ and one of the other principal refractive indices $n_a$ or $n_c$ which lies in the surface plane incline clockwise or counterclockwise about the remaining principal refractive index $n_c$ or $n_a$.

As the former phase difference plate, a uniaxial or biaxial phase difference plate can be used. For the latter one, two phase difference plates, instead of one, can be used in such a combination that the two principal refractive indices $n_b$ form an angle of 90°.

A liquid crystal display device, incorporating at least one such phase difference plate between the liquid crystal display element and the polarization plate exhibits some restraint in the contrast variations, coloration phenomenon, and reversion phenomenon caused by the viewing-angle dependence of the display screen.

However, with today's increasingly large demand on a wider effectual range of viewing angle and superb display quality, a better restraint in the viewing-angle dependence is crucial. In this context, the phase difference plate disclosed in Japanese Laid-Open Patent Application No. 6-75116/1994 (Tokukaihei 6-75116) above does not provide satisfactory solutions and needs to be improved.

SUMMARY OF THE INVENTION

An object of the present invention is to offer a liquid crystal display device with improved viewing angle characteristics which includes a phase difference plate represented by the aforementioned refractive index ellipsoid either inclining or not inclining to the surface of the phase difference plate.

In order to accomplish the object, a liquid crystal display device in accordance with the present invention has:
  a liquid crystal display element including: a pair of light-transmitting substrates each including a transparent electrode layer and an alignment layer on the surface thereof facing the other; and a liquid crystal layer sandwiched by the light-transmitting substrates and constituted by a liquid crystal material of which the refractive index anisotropy is specified to vary with wavelengths of rays of light within a range that allows no viewing-angle dependent coloration to occur on a liquid crystal screen;
  a pair of polarizers disposed so as to sandwich the liquid crystal display element; and
  at least one phase difference plate disposed between the liquid crystal display element and the pair of polarizers,
  wherein the phase difference plate has three principal refractive indices $n_a$, $n_b$, and $n_c$ being mutually related by the inequality $n_a < n_b < n_c$, and the principal refractive index $n_b$ inclines to the normal to a surface of the phase difference plate.

With the configuration, for a case where a linearly polarized ray is converted to an elliptically polarized ray according to the phase difference between the ordinary and extraordinary rays developed from the linearly polarized ray upon the passage through the liquid crystal layer possessing birefringence, a phase difference plate is used such that the principal refractive indices $n_a$, $n_b$, and $n_c$ are being mutually related by the inequality $n_a < n_b < n_c$ and that the principal refractive index $n_b$ inclines as mentioned above. Therefore, as to the phase difference plate, the aforementioned refractive index ellipsoid described by the principal refractive indices $n_a$, $n_b$, and $n_c$ that are orthogonal to each other inclines to the surface. The phase difference plate disposed between the liquid crystal layer and the polarizer compensates for the phase difference between the ordinary and extraordinary rays for all viewing angles.

However, a compensation function of this kind still falls short of satisfying the demand for a better restraint in the viewing-angle dependence.

Bearing that fact in mind, the inventors of the present invention worked diligently and found out that the variations in the refractive index anisotropy of the liquid crystal material in the liquid crystal layer with wavelengths of rays of light affect the coloration on a liquid crystal screen (display screen) substantially, which lead to the completion of the liquid crystal display device.

In the liquid crystal display device in accordance with the present invention, the refractive index anisotropy an of the liquid crystal material constituting the liquid crystal layer is specified to vary with wavelengths of rays of light within a range that allows no viewing-angle dependent coloration to occur on a liquid crystal screen. This restrains, in the liquid crystal display device incorporating a phase difference plate represented by a refractive index ellipsoid that inclines to the phase difference plate, the coloration on the screen better. The contrast variations and reversion phenomenon are also restrained better than only by the compensation function by the phase difference plate.

In order to accomplish the object, another liquid crystal display device in accordance with the present invention has:
- a liquid crystal display element including: a pair of light-transmitting substrates each including a transparent electrode layer and an alignment layer on the surface thereof facing the other; and a liquid crystal layer sandwiched by the light-transmitting substrates and constituted by a liquid crystal material of which the refractive index anisotropy is specified to vary with wavelengths of rays of light within a range that allows no viewing-angle dependent coloration to occur on a liquid crystal screen;
- a pair of polarizers disposed so as to sandwich the liquid crystal display element; and
- at least one phase difference plate disposed between the liquid crystal display element and the pair of polarizers, wherein the phase difference plate has three principal refractive indices $n_a$, $n_b$, and $n_c$ being such that $n_a = n_c > n_b$, and the principal refractive indices $n_a$ and $n_c$ being parallel to the surface of the phase difference plate, the principal refractive index $n_b$ being parallel to the normal to the surface.

With the configuration, for a case where a linearly polarized ray is converted to an elliptically polarized ray according to the phase difference between the ordinary and extraordinary rays developed from the linearly polarized ray upon the passage through the liquid crystal layer possessing birefringence, a phase difference plate is used such that the principal refractive indices $n_a$ and $n_c$ parallel to the surface, and the principal refractive index $n_b$ parallel to the normal to the surface have the relation of $n_a = n_c > n_b$. The phase difference plate disposed between the liquid crystal layer and the polarizer compensates for the phase difference between the ordinary and extraordinary rays for all viewing angles.

However, a compensation function of this kind still falls short of satisfying the demand for a better restraint in the viewing-angle dependence.

Bearing that fact in mind, the inventors of the present invention worked, along the same line as the aforementioned liquid crystal display device, to complete the other liquid crystal display device based on the findings that the variations in the refractive index anisotropy of the liquid crystal material constituting the liquid crystal layer with wavelengths of rays of light affect the coloration on a liquid crystal screen substantially.

In the liquid crystal display device in accordance with the present invention, the refractive index anisotropy $\Delta n$ of the liquid crystal material constituting the liquid crystal layer is specified to vary with wavelengths of rays of light within a range that allows no viewing-angle dependent coloration to occur on a liquid crystal screen. This restrains, in the liquid crystal display device incorporating a phase difference plate represented by a refractive index ellipsoid that does not incline to the phase difference plate, the coloration on the screen better. The contrast variations and reversion phenomenon are also restrained better than only by the compensation function by the phase difference plate.

For a fuller understanding of the nature and advantages of the invention, reference should be made to the ensuing detailed description taken in conjunction with the accompanying drawings.

DESCRIPTION OF THE EMBODIMENTS

First Embodiment

Referring to FIGS. 1 through 9, the following description will discuss the first embodiment in accordance with the present invention.

Figure 1:
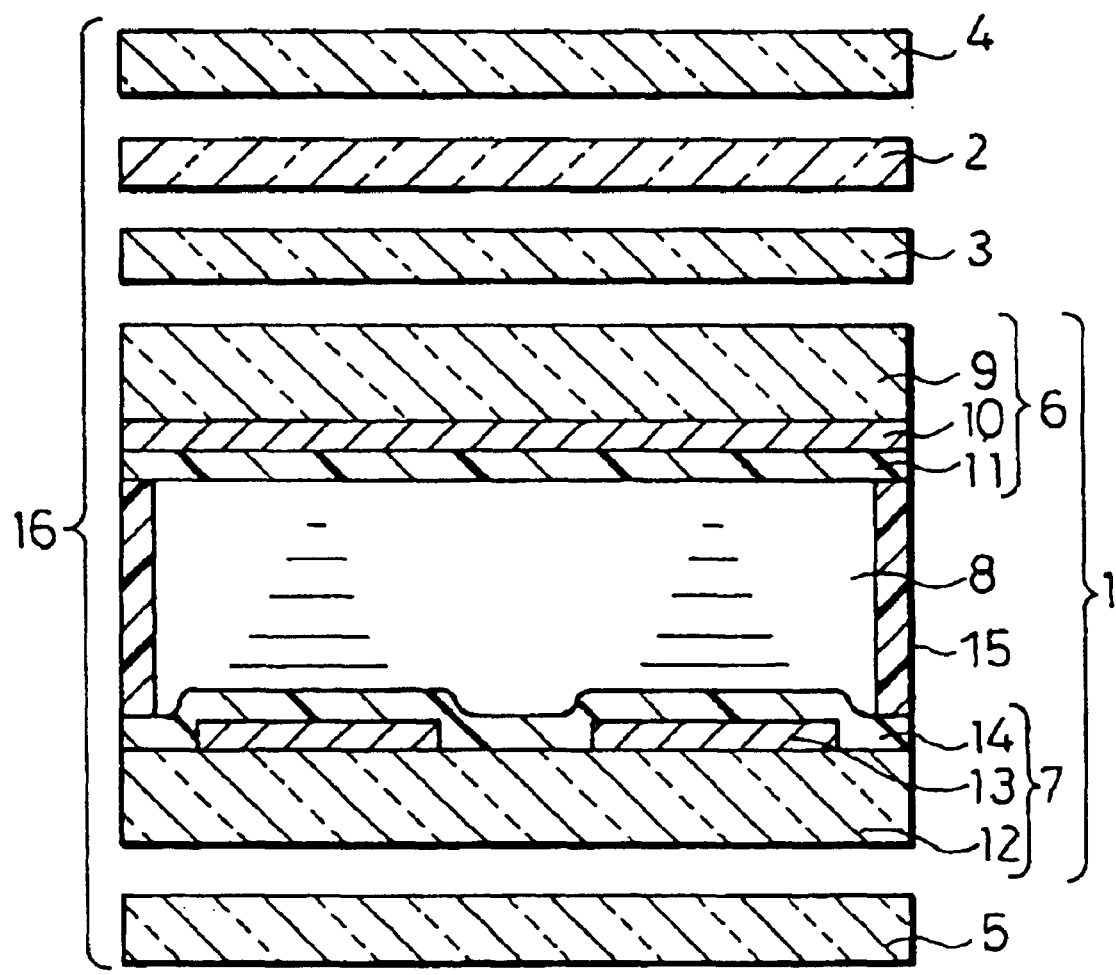
FIG. 1 is a cross-sectional view of a configuration of a liquid crystal display device of the first embodiment in accordance with the present invention, showing some components detached from others.

As illustrated in FIG. 1, the liquid crystal display device of the present embodiment is provided with a liquid crystal display element 1, a pair of phase difference plates 2 and 3, and a pair of polarization plates (polarizers) 4 and 5.

The liquid crystal display element 1 is constituted by electrode substrates 6 and 7 that are placed face to face with each other and a liquid crystal layer 8 that is sandwiched in between. The electrode substrate 6 is constructed as follows: a glass substrate (a light-transmitting substrate) 9 is provided as a base, a transparent electrode 10, made of ITO (Indium Tin Oxide), is formed on the surface, of the glass substrate 9, facing the liquid crystal layer 8, and an alignment film 11 is formed on the transparent electrode 10. The electrode substrate 7 is also constructed in the same manner; a glass substrate (a light-transmitting substrate) 12 is provided as a base, a transparent electrode 13, made of ITO, is formed on the surface, of the glass substrate 12, facing the liquid crystal layer 8, and an alignment film 14 is formed on the transparent electrode 13.

Although FIG. 1 shows a construction corresponding to two pixels for convenience of explanation, the transparent electrodes 10 and 13, which are strips with a predetermined width, are respectively placed on the glass substrates 9 and 12 with predetermined intervals all over the liquid crystal display element 1, and are designed so that they are orthogonal to each other on the glass substrates 9 and 12, when viewed in a direction perpendicular to the substrate surfaces. Each portion at which the transparent electrodes 10 and 13 intersect each other corresponds to a pixel for carrying out display, and the pixels are placed in a matrix format over the entire structure of the present liquid crystal display device. A voltage is applied to the transparent electrodes 10 and 13 by a driving circuit (not shown) according to display data.

The electrode substrates 6 and 7 are bonded by seal resin 15, and a liquid crystal layer 8 is sealed inside the space that is formed by the electrode substrates 6 and 7 and the seal resin 15. The liquid crystal layer 8 is made up of such a liquid crystal material that the refractive index anisotropy Δn thereof satisfies a predetermined condition to produce the best properties when combined with the compensation function of phase difference by the phase difference plates 2 and 3 (will be described later in detail).

In the present liquid crystal display device, a unit, which is formed by incorporating phase difference plates 2 and 3 and polarization plates (polarizers) 4 and 5 into the above-mentioned liquid crystal display element 1, is referred to as a liquid crystal cell 16.

Figure 2:
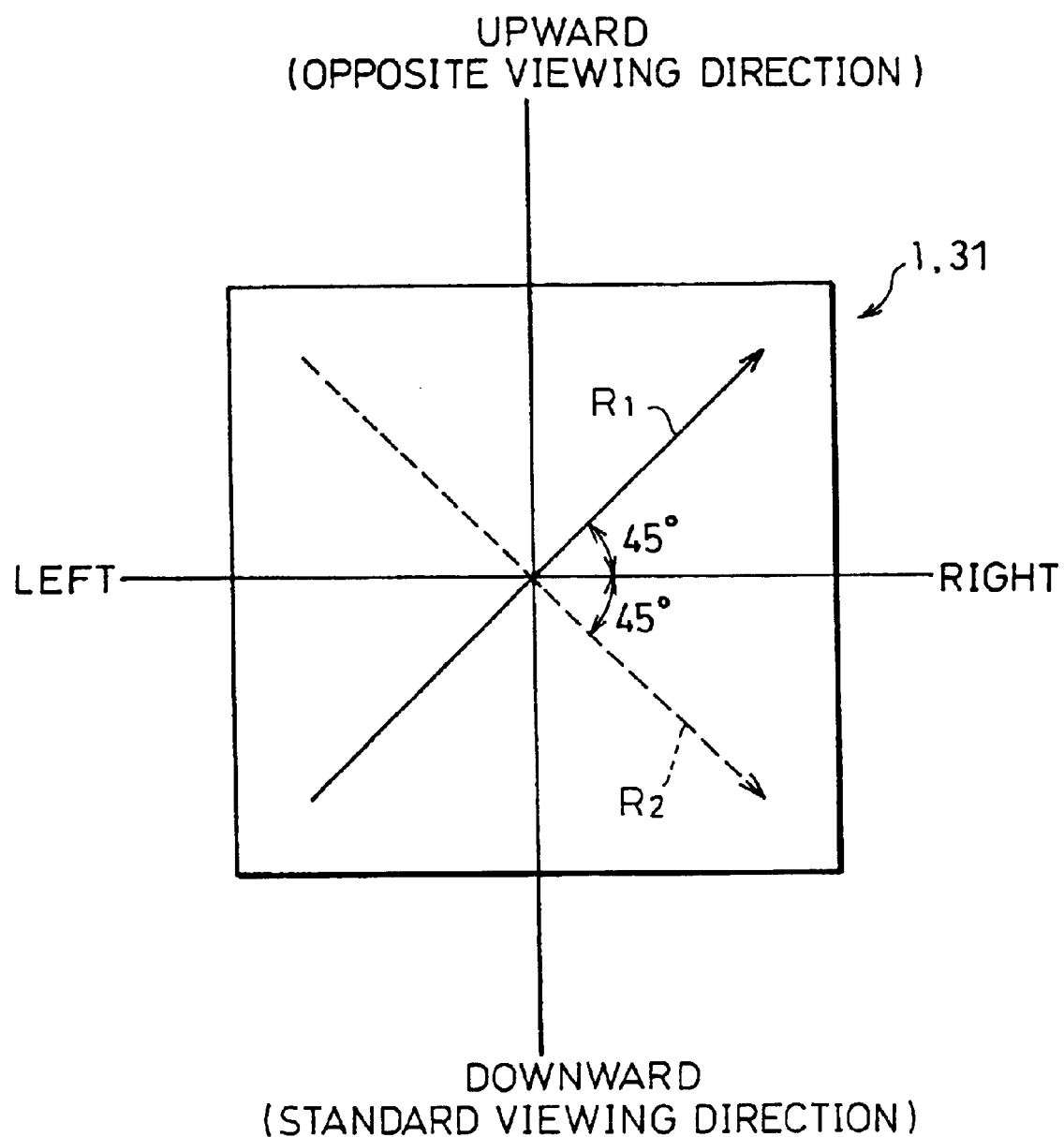
FIG. 2 is a an explanatory drawing showing the relation between the standard viewing direction and the rubbing direction of an orientation film of a liquid crystal display device of the first and second embodiments in accordance with the present invention.

The alignment films 11 and 14 are treated with a rubbing technique in advance so that the liquid crystal molecules between them are oriented with a twist angle of about 90°. As shown in FIG. 2, the rubbing direction $R_1$ of the alignment film 11 and the rubbing direction $R_2$ of the alignment film 14 are set to be orthogonal to each other.

The phase difference plates 2 and 3 are provided overlapping between the liquid crystal display element 1 and the polarization plate 4. The phase difference plates 2 and 3 are constituted by a support base made up of a transparent organic high polymer and a liquid crystal polymer with a positive refractive index anisotropy provided on the support base. The liquid crystal polymer are treated with an oblique orientation technique or hybrid orientation, and crosslinked. As a result, the phase difference plates 2 and 3 are formed so as to have a refractive index ellipsoid (will be described later in detail) that slants to the phase difference plates 2 and 3.

With respect to the support base of the phase difference plates 2 and 3, triacetylcellulose (TAC), which is generally used for polarization plates, is suitably applied with high reliability. Besides this, colorless, transparent organic polymeric films made of polycarbonate (PC), polyethylene-terephthalate (PET), etc., which are superior in weather resistance and chemical resistance, are also suitably applied.

Figure 3:
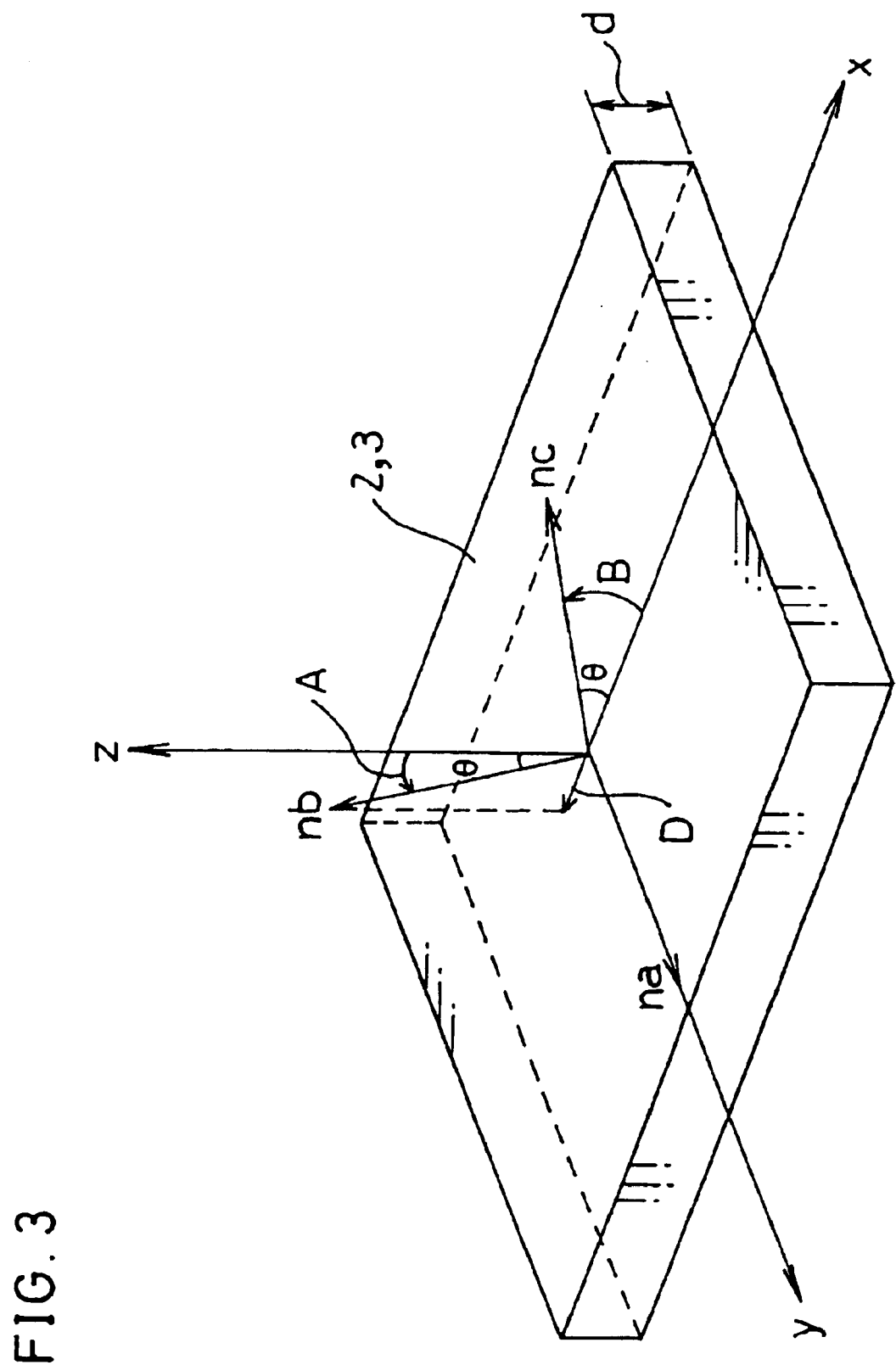
FIG. 3 is a perspective view illustrating principal refractive indices of a phase difference plate of the liquid crystal display device.

As illustrated in FIG. 3, each of the phase difference plates 2 and 3 has principal refractive indexes $n_a$, $n_b$ and $n_c$ pointing in three different directions. The direction of the principal refractive index $n_a$ coincides with the direction of the y-coordinate axis among the x, y, and z-coordinate axes that are orthogonal to each other. The direction of the principal refractive index $n_b$ inclines by θ in the direction of arrow A with respect to the z-coordinate axis (parallel to a normal to the surface) that is perpendicular to the surface of the phase difference plates 2 and 3 that corresponds to the screen. Alternatively (not shown), the principal refractive index $n_c$ and the x-coordinate axis, not the principal refractive index $n_a$ and the y-coordinate axis, may be in the same the direction. In this case, the direction of the principal refractive index $n_b$ inclines toward or away from the y-coordinate axis with respect to the z-coordinate axis.

The principal refractive indices $n_a$, $n_b$, and $n_c$ of the phase difference plates 2 and 3 are related to each other by the inequality: $n_a < n_b < n_c$. Therefore, there exist two optic axes, and the phase difference plates 2 and 3 have biaxiality and a positive refractive index anisotropy. The phase difference plates 2 and 3 have a first retardation value: $(n_c - n_a) \times d = 220$ nm, and a second retardation value: $(n_c - n_b) \times d = 35$ nm, where $(n_c - n_a)$ and $(n_c - n_b)$ each represent a refractive index anisotropy Δn, and d represents the thickness of the phase difference plates 2 and 3.

The angle θ by which the direction of the principal refractive index $n_c$ of the phase difference plates 2 and 3 inclines, i.e. the inclination angle θ of the refractive index ellipsoid, is set to an arbitrary value in the range $15° \leq \theta \leq 75°$. By setting the inclination angle θ to such a value, regardless of whether the refractive index ellipsoid inclines clockwise or counterclockwise, the compensation function of phase difference by the phase difference plates 2 and 3 is surely achieved.

Instead of using the two phase difference plates 2 and 3, one of them may be disposed on one side. As a further alternative, three or more phase difference plates may be used.

Figure 4:
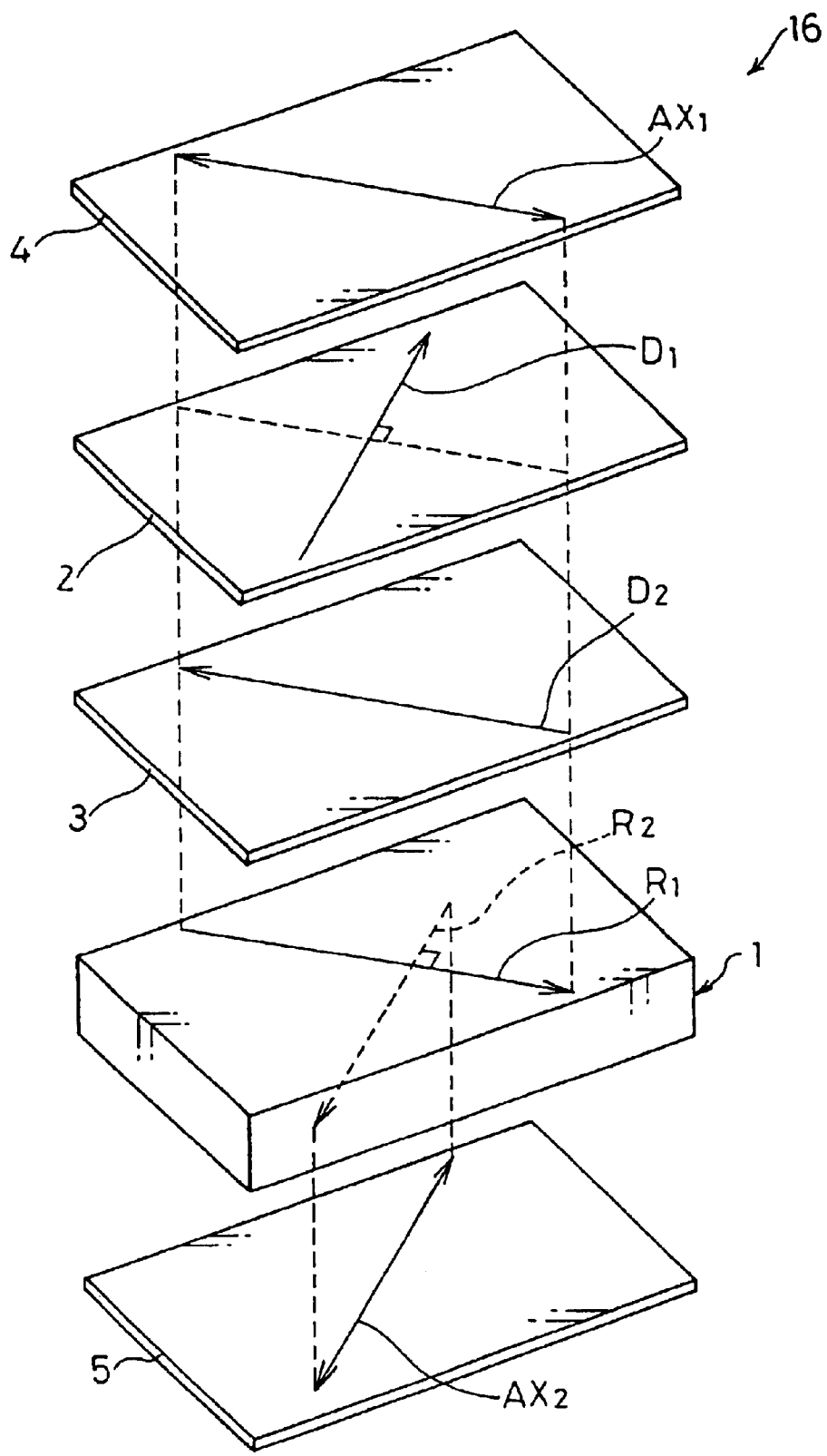
FIG. 4 is a perspective view illustrating an optical arrangement of polarization plates and phase difference plates of the liquid crystal display device, showing each component separately from the others.

As illustrated in FIG. 4, the polarization plates 4 and 5 in the liquid crystal display element 1 are arranged so that their absorption axes $AX_1$ and $AX_2$ are respectively parallel to the rubbing directions $R_1$ and $R_2$ of the alignment films 11 and 14 (see FIG. 1). In the present liquid crystal display device, since the rubbing directions $R_1$ and $R_2$ are orthogonal to each other, the absorption axes $AX_1$ and $AX_2$ are also orthogonal to each other.

Here, as illustrated in FIG. 3, a direction which is formed by projecting the direction of the principal refractive index $n_b$, which is inclined in the direction to impart anisotropy to the phase difference plates 2 and 3, onto the surfaces of the phase difference plates 2 and 3 is defined as direction D.

As illustrated in FIG. 4, the phase difference plate 2 is placed so that direction D (direction $D_1$) is parallel to the rubbing direction $R_2$, and the phase difference plate 3 is placed so that direction D (direction $D_2$) is parallel to the rubbing direction $R_1$.

With the above-mentioned arrangement of the phase difference plates 2 and 3 and the polarization plates 4 and 5, the present liquid crystal display device can carry out the so-called normally white display wherein rays of light are allowed to pass during off-time so that white display is provided.

In general, in optical anisotropic materials such as liquid crystal and phase difference plates (phase difference films), the above-mentioned anisotropy including the three-dimensional principal refractive indexes $n_a$, $n_c$ and $n_b$ is represented by a refractive index ellipsoid satisfying the equation below. The refractive-index anisotropy an assumes different values depending on: which direction the refractive index ellipsoid is observed from. The refractive index ellipsoid for the phase difference plates 2 and 3 slants as mentioned above and is represented by the following equation.

$$(x/n_c)^2+(y/n_a)^2+(z/n_b)^2=1$$

Next, the liquid crystal layer 8 will be explained in detail.

As mentioned above, the liquid crystal layer 8 is made up of such a liquid crystal material that the refractive index anisotropy Δn thereof satisfies a predetermined condition to produce the best properties when combined with the compensation function of phase difference by the phase difference plates 2 and 3: namely, the refractive index anisotropy Δn is set in such a range that the variations in the refractive index anisotropy Δn with wavelengths of rays do not cause viewing-angle-dependent coloration on the liquid crystal screen.

Specifically, the liquid crystal material for use is designed to meet the following condition on specification ranges.

Δn(450)–Δn(650), i.e. the difference between the refractive index anisotropy Δn(450) of the liquid crystal material for rays of light having the wavelength of 450 nm and the refractive index anisotropy Δn(650) thereof for rays of light having the wavelength of 650 nm, is set in a range not less than 0.0070 to not more than 0.0250. The difference is more preferably set in a range not less than 0.0200 to not more than 0.0250.

By using a liquid crystal material designed to meet such a condition, not only the restraint in the contrast variations, coloration phenomenon, and reversion phenomenon caused by the viewing-angle dependence of the display screen by the compensation function of phase difference by the phase difference plates 2 and 3, but the coloration phenomenon of the display screen not caused by the viewing-angle dependence is also restrained.

More specifically, if a liquid crystal material designed so as to assume at least one value in the above-mentioned wider range is used, the resultant liquid crystal display device, exhibiting coloration at the viewing angle of 50° which is typically required for liquid crystal display devices, however, can display images that are up to standard for real use for any viewing direction.

Especially, by assuming at least one value in the above-mentioned more preferable range, the resultant liquid crystal display device is free from any coloration for any viewing direction at the viewing angle of 70°.

Besides, by using a liquid crystal material designed to meet the range, the contrast variations and reversion phenomenon are better restrained than only by the compensation function by the phase difference plates 2 and 3.

Moreover, in the present liquid crystal display device, the condition below is preferably met as well as the aforementioned condition. For such a case, more specifically, the following condition is satisfied in the liquid crystal layer 8.

The refractive index anisotropy Δn(550) of the liquid crystal material for rays of light having the wavelength of 550 nm is set to be larger than 0.060 and smaller than 0.120. More preferably, the refractive index anisotropy Δn(550) is set to be not less than 0.070 and not more than 0.095.

By meeting such an additional condition, it becomes possible to restrain not only the viewing-angle dependence with the compensation function of phase difference by the phase difference plates 2 and 3 and with the compensation function based on the aforementioned range condition on the difference between the refractive index anisotropies Δn, but also the decrease in contrast ratio in the opposite viewing direction and the reversion phenomenon in the left and right directions.

Figure 5:
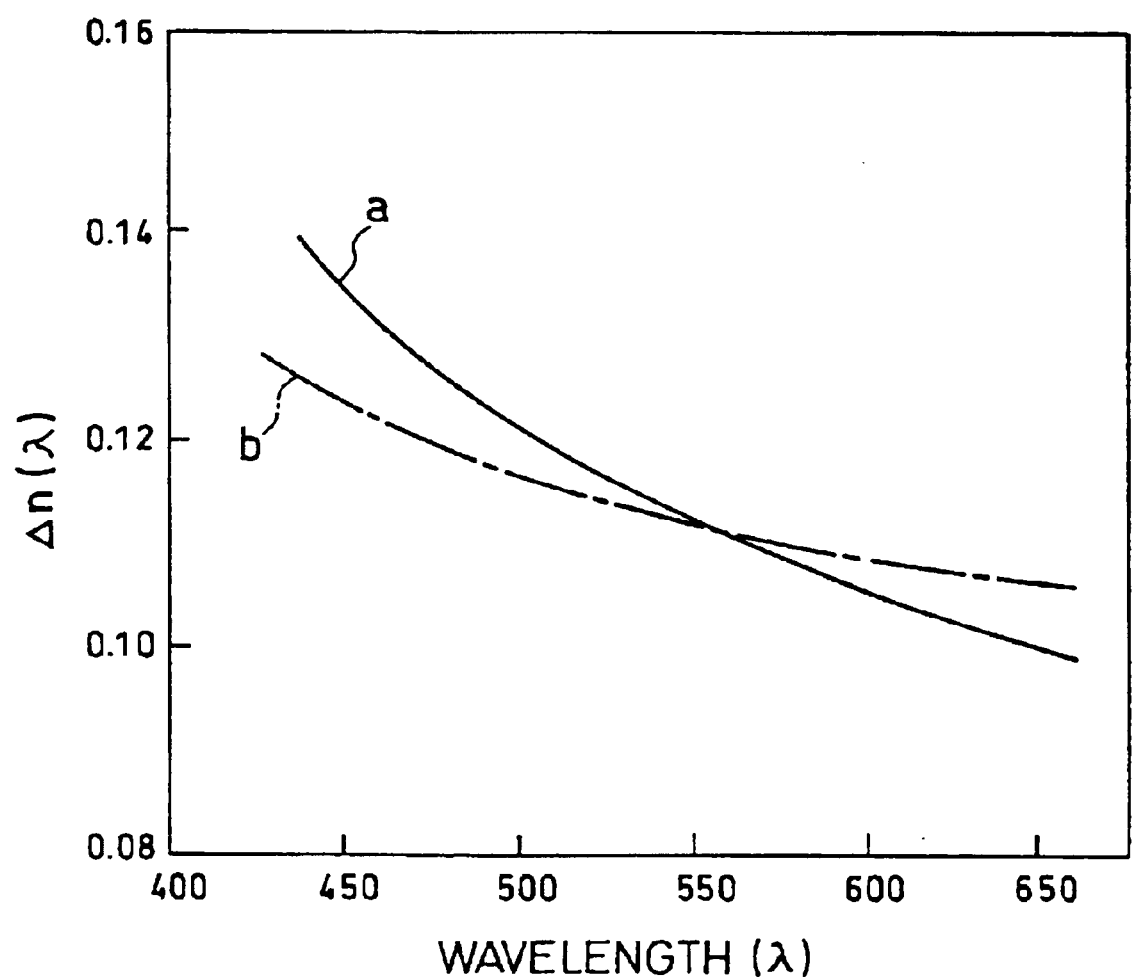
FIG. 5 is a graphical representation of refractive index anisotropy $\Delta n$ versus wavelength of a liquid crystal material used for a liquid crystal layer of the liquid crystal display device.

FIG. 5 shows, in a solid curve a, Δn(λ) against wavelengths (λ), i.e. refractive index anisotropy Δn versus wavelength characteristics, of a liquid crystal material usable for the liquid crystal layer 8 of the present liquid crystal display device. For the purpose of comparison, FIG. 5 also shows, in an alternate long and short dash curve b, Δn(λ) against wavelengths (λ) of a liquid crystal material conventionally used for the liquid crystal layer of a liquid crystal display device.

It can be understood from the comparison of the curves a and b that the slope of the refractive index anisotropy an versus wavelength characteristics of the present liquid crystal display device is sharper than that of the refractive index anisotropy Δn versus wavelength characteristics of a conventional liquid crystal display device.

Figure 6:
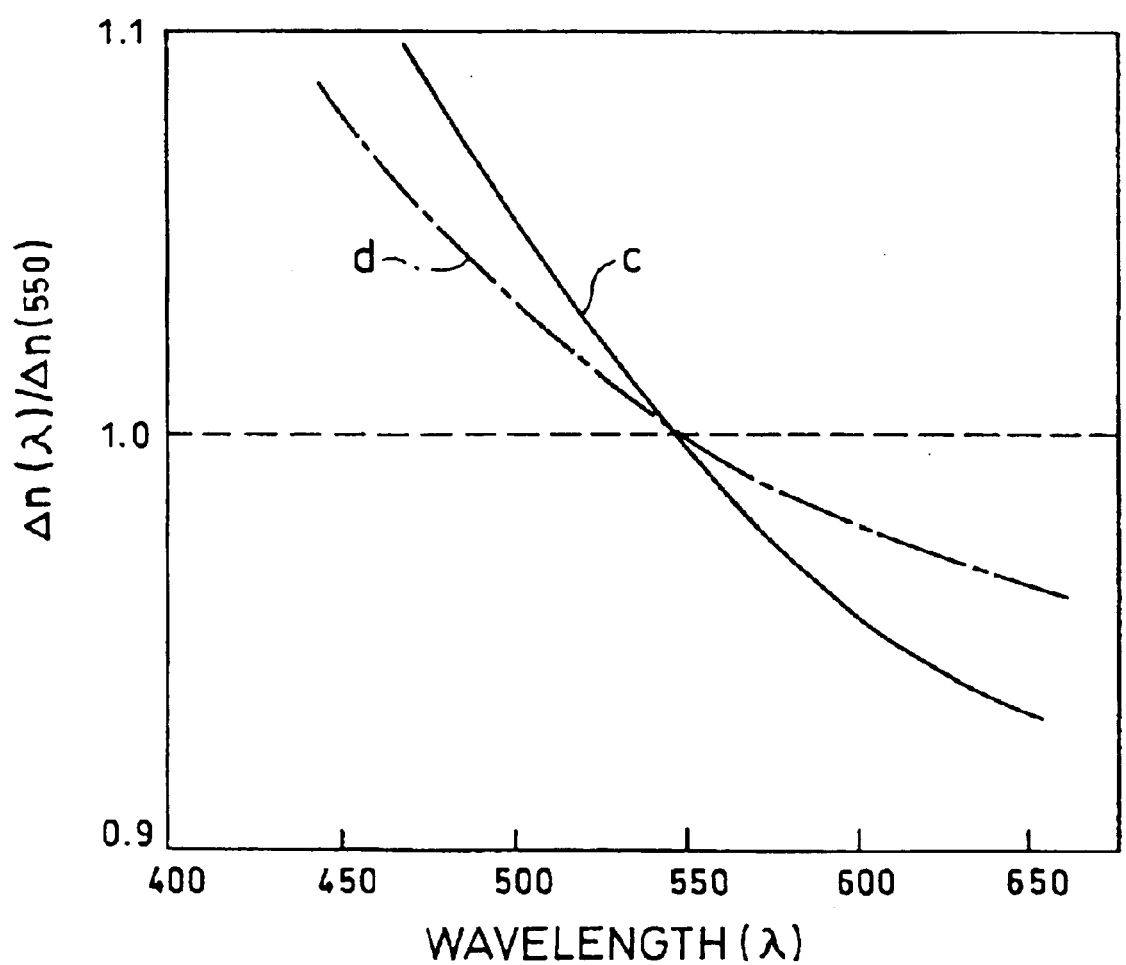
FIG. 6 is a graphical representation of $\Delta n(\lambda)/\Delta n(550)$ versus wavelength of a liquid crystal material used for a liquid crystal layer of the liquid crystal display device.

FIG. 6 shows, in a solid curve c, Δn(λ)/Δn(550) against wavelengths (λ) of another liquid crystal material usable for the liquid crystal layer 8 of the present liquid crystal display device. For the purpose of comparison, FIG. 6 also shows, in an alternate long and short dash curve d, Δn(λ)/Δn(550) against wavelengths (λ) of a liquid crystal material conventionally used for the liquid crystal layer of a liquid crystal display device.

It can be understood from the comparison of the curves c and d that the slope depicting the changes in Δn(λ)/Δn(550) of the present liquid crystal display device is also sharper than that depicting the changes in Δn(λ)/Δn(550) of a conventional liquid crystal display device.

The liquid crystal display device of the present embodiment configured in this manner has a compensation function by the phase difference plates 2 and 3 for a phase difference that occurs to the liquid crystal display element 1 in accordance with the viewing angle, and a compensation function based on such a specification of the variations in the refractive index anisotropy Δn with wavelengths of rays of light passing through the liquid crystal material in the liquid crystal layer 8 as to fall in a range where no coloration occurs on the liquid crystal screen. Since this properly restrains the contrast variations, coloration phenomenon, and reversion phenomenon caused by the viewing-angle dependence, images can be displayed in high quality.

Next, the following description will explain examples of the present embodiment configured as above, together with a comparative example.

EXAMPLE 1

In the present example, five samples #1 to #5, each having a cell gap (the thickness of the liquid crystal layer 8) set to 5 82 m, were used as samples of the liquid crystal display device shown in FIG. 1. Δn(450)−Δn(650), i.e. the difference between the refractive index anisotropy Δn(450) of the liquid crystal material constituting the liquid crystal layer 8 for the wavelength of 450 nm and the refractive index anisotropy Δn(650) thereof for the wavelength of 650 nm, was set to 0.0070, 0.0090, 0.0120, 0.0200 and 0.0250 for the samples #1 to #5 respectively.

The phase difference plates 2 and 3 of the samples #1 to #5 were each constituted by a transparent support base (e.g. triacetylcellulose (TAC)) and a liquid crystal polymer with a positive refractive index anisotropy that was provided on the support base, treated with an oblique orientation technique, and crosslinked. The first and second retardation values of the phase difference plates 2 and 3 were respectively set to 220 nm and 35 nm as mentioned above. Since the inclination angle θ of the refractive index ellipsoid for the phase difference plates 2 and 3 was 20°, the direction of the principal refractive index $n_b$ inclined by about 20° in the direction of arrow A with respect to the z-coordinate axis among the x, y, and z-coordinate axes, and the direction of the principal refractive index $n_c$ inclined by about 20° in the direction of arrow B with respect to the x-coordinate axis.

A comparative sample #100 was prepared as a comparative example for the present example, the comparative sample #100 having the same configuration as the present example except that a liquid crystal material of Δn(450)−Δn(650)=0.0045 was used for the liquid crystal layer 8 of the liquid crystal display device shown in FIG. 1.

Table 1 shows results of visual inspections of the samples #1 to #5 and the comparative sample #100 in white light.

TABLE 1

| | Δn(450) − Δn(650) (× 10⁻³) | | | | | |
|---|---|---|---|---|---|---|
| Viewing Angles (θ) | 4.5 #100 | 7.0 #1 | 9.0 #2 | 12.0 #3 | 20.0 #4 | 25.0 #5 |
| 50° | NG | G | E | E | E | E |
| 60° | NG | NG | G | E | E | E |
| 70° | NG | NG | NG | G | E | E |

In Table 1, E stands for "Excellent" and indicates that no coloration was observed, G stands for "Good" and indicates that coloration was observed to the extent that did not pose any problem for real use, and NG stands for "No Good" and indicates that coloration was so evident as to be intolerable for real use.

The samples #4 and #5 of the example produced good image quality with no coloration observed at all from any viewing direction at the viewing angle of 70°. The sample #3 produced good image quality with no coloration observed at all from any viewing direction up to the viewing angle of 60°. The sample #2 produced good image quality with no coloration observed at all from any viewing direction up to the viewing angle of 50°. The sample #1 exhibited coloration when viewed from the left and right directions at the viewing angle of 50°, but the coloration was only to an extent that was tolerable for real use.

By contrast, the comparative sample #100 exhibited yellow-to-orange coloration to the extent that was intolerable for real use when viewed from the left and right directions at the viewing angle of 50°.

The same results were obtained from the samples having such phase difference plates 2 and 3 that the liquid crystal polymers provided on the transparent support base were treated with a hybrid orientation technique.

EXAMPLE 2

Figure 7:
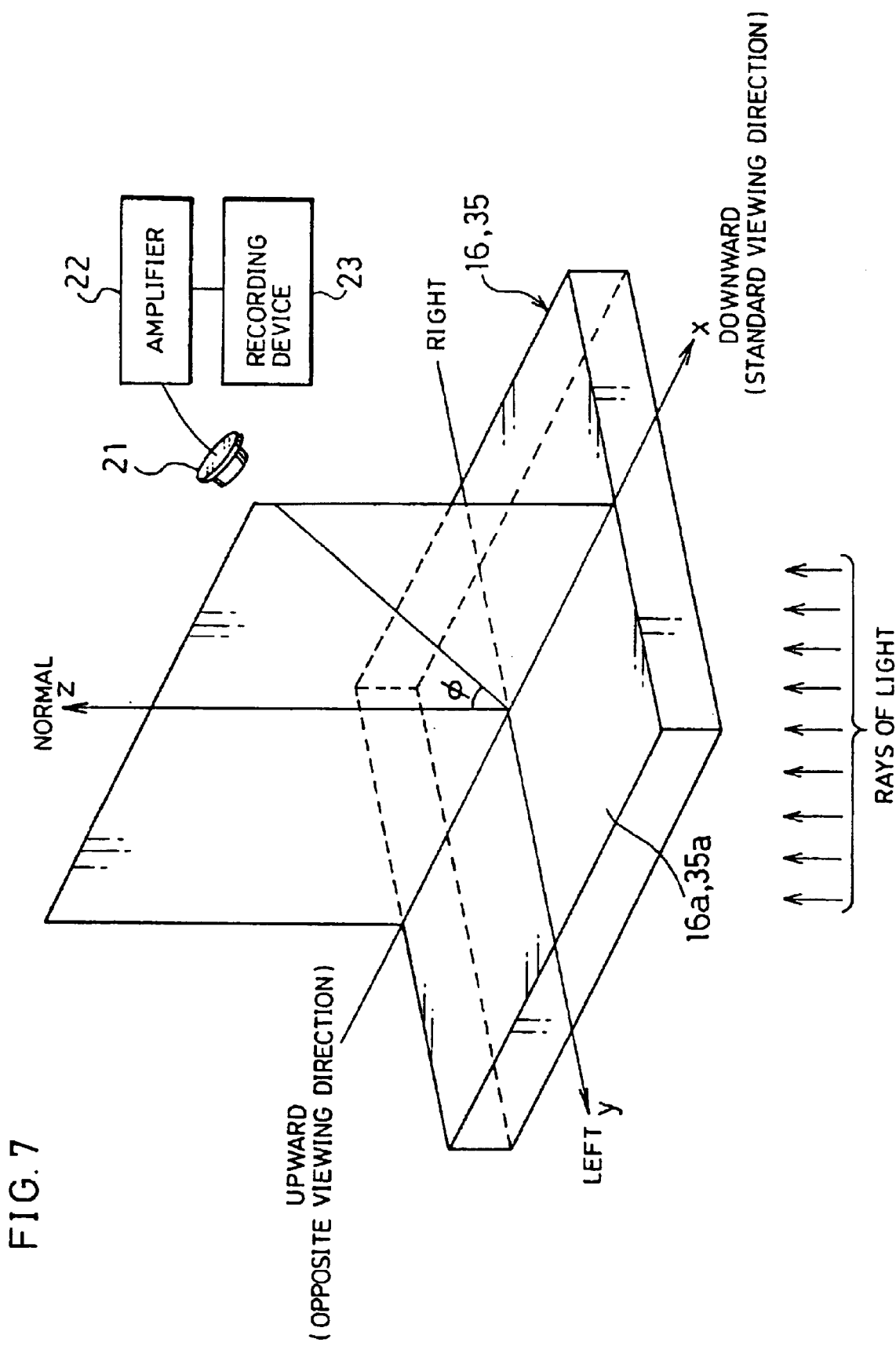
FIG. 7 is a perspective view illustrating a measuring system of the viewing-angle dependence of the liquid crystal display devices of the first and second embodiments.

As illustrated in FIG. 7, the measuring system on the viewing-angle dependence of the liquid crystal display device is provided with a light-receiving element 21, an amplifier 22 and a recording device 23. The liquid crystal cell 16 is placed so that the surface 16a thereof facing the glass substrate 9 is located on the reference surface x-y of the rectangular coordinates x, y and z. The light-receiving element 21 is an element capable of receiving light with a constant stereoscopic light-receiving angle, and is placed at a position a predetermined distance apart from the coordinate origin in a direction making an angle φ (viewing angle) with respect to the z-direction that is perpendicular to the surface 16a.

During the measuring process, monochromatic light with a wavelength of 550 nm is directed to the liquid crystal cell 16 installed in the present measuring system through a surface of the liquid crystal cell 16 that is opposite to the surface 16a. One part of the monochromatic light that has passed through the liquid crystal cell 16 is made incident on the light-receiving element 21. The output of the light-receiving element 21, after having been amplified to a predetermined level by the amplifier 22, is recorded by the recording device 23 such as a waveform memory or a recorder.

In the present example, three samples #6 to #8, each having a cell gap set to 5 μm, were used. The refractive index anisotropy Δn(550) of the liquid crystal material constituting the liquid crystal layer 8 in the liquid crystal cell 16 shown in FIG. 1 for the wavelength of 550 nm were set to 0.070, 0.080 and 0.095 for the samples #6 to #8 respectively. The phase difference plates 2 and 3 of the samples #6 to #8 were the same as those of the aforementioned first example in which the liquid crystal polymer was treated with an oblique orientation technique.

These samples #6 to #8 were placed in the measuring system shown in FIG. 7 to measure the output levels of the light receiving element 21 fixed at a constant angle φ in response to voltages applied across the samples #6 to #8.

The measurement was done with the light receiving element 21 disposed so that the angle φ equaled 50° and fixed upward (in the opposite viewing direction), on the presumption that the y direction is toward the left side of the display screen and the x direction is toward the bottom side of the display screen.

Figure 8:
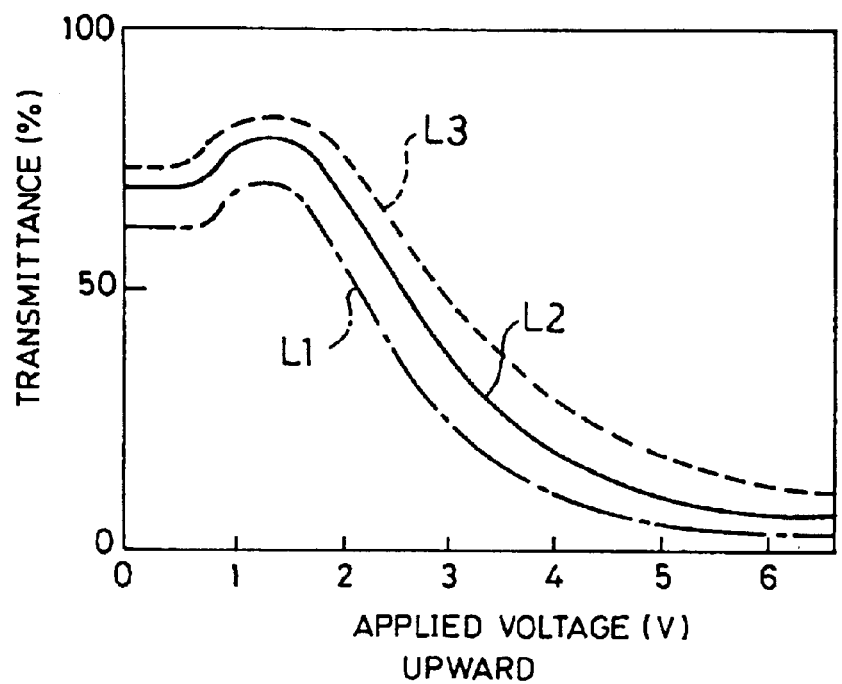
FIG. 8 is a graphical representation showing transmittance versus applied voltage characteristics of liquid crystal of a liquid crystal display device of the first example of the first embodiment.

The results of the measurement are plotted in the graph of FIG. 8 as transmittances of light against voltages applied across the samples #6 to #8 (transmittance versus applied voltage characteristics). In FIG. 8, the alternate long and short dash curve L1 represents the characteristics of the sample #6, the solid curve L2 represents the characteristics of the sample #7, and the broken curve L3 represents the characteristics of the sample #8.

Two comparative samples #101 and #102 were prepared as a comparative example for the present example, the comparative samples #101 and #102 having the same configurations as the samples #6 to #8 except that liquid crystal materials having refractive index anisotropies $\Delta n(550)$ for the wavelength of 550 nm set to 0.060 and 0.120 respectively were used for the liquid crystal layer 8 of the liquid crystal cell 16 shown in FIG. 1. In the same manner as the present example, these comparative samples #101 and #102 were placed in the measuring system shown in FIG. 7 to measure the output levels of the light receiving element 21 fixed at a constant angle $\phi$ in response to voltages applied across the comparative samples #101 and #102.

The measurement was done with the light receiving element 21 disposed so that the angle $\phi$ equaled 50° and fixed upward.

Figure 9:
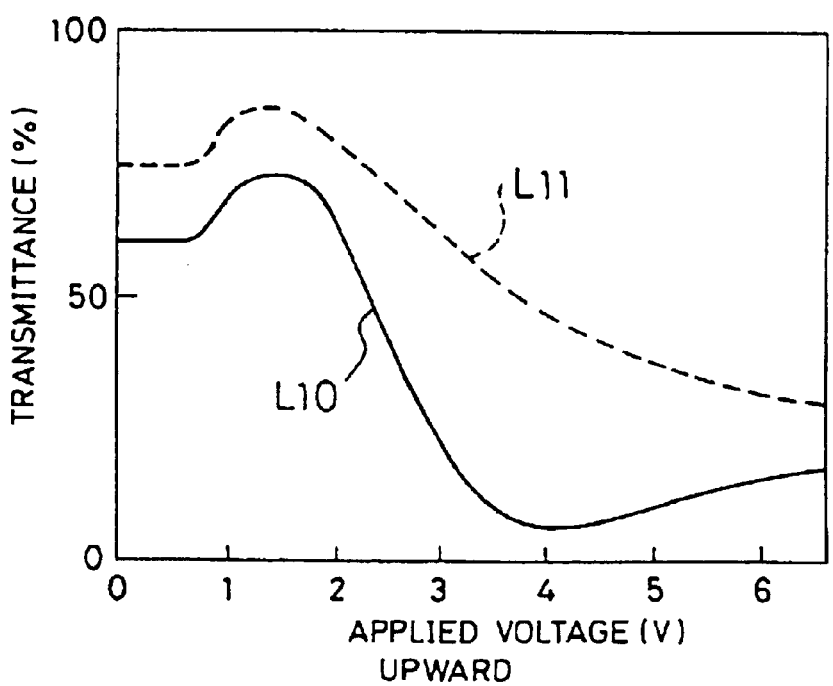
FIG. 9 is a graphical representation showing transmittance versus applied voltage characteristics of liquid crystal of a liquid crystal display device of a comparative example for the first example.

The results of the measurement are plotted in the graph of FIG. 9 as transmittances of light against voltages applied across the comparative samples #101 and #102 (transmittance versus applied voltage characteristics). In FIG. 9, the solid curve L10 represents the characteristics of the comparative sample #101, and the broken curve L11 represents the characteristics of the comparative sample #102.

The samples #6 to #8 of the present example were compared with the comparative samples #101 and #102 of the comparative example with respect to the upward transmittance versus applied voltage characteristics. As illustrated by L1 to L3 in FIG. 8, the transmittance of the samples #6 to #8 decreased by substantial amounts with higher voltages applied across the samples #6 to #8. By contrast, as illustrated by L11 in FIG. 9, the transmittance of the comparative sample #102 decreased only by small amounts with higher voltages applied across the comparative sample #102. As illustrated by L10 in FIG. 9, the transmittance of the comparative sample #101 exhibited the reversion phenomenon, increasing with higher voltages applied across the comparative sample #101 after the initial drop.

The samples #6 and #8 produced good image quality with no coloration observed at all from any viewing direction at the viewing angle of 50°. By contrast, the comparative samples #101 and #102 exhibited yellow-to-orange coloration when viewed from the left and right directions at the viewing angle of 50°.

The characteristics shown in FIG. 8 clearly tell that the viewing angle widened when liquid crystal materials having refractive index anisotropies $\Delta n(550)$ for the wavelength of 550 nm set to 0.070, 0.080 and 0.095 respectively were used for the liquid crystal layer 8 as mentioned above, because the transmittance decreased by substantial amounts with higher voltages and no reversion phenomenon occurred. It is understood that in this case the display quality of the liquid crystal display device improved remarkably with no coloration taking place.

On the other hand, the characteristics shown in FIG. 9 tell that the viewing-angle dependence is not restrained sufficiently when liquid crystal materials having refractive index anisotropies $\Delta n(550)$ set to 0.060 and 0.120 respectively were used for the liquid crystal layer 8.

The same results as from the samples #6 to #8 were obtained from samples having the same configurations as the samples #6 to #8 except that the liquid crystal polymers constituting the phase difference plates 2 and 3 were treated with a hybrid orientation technique. Similarly, the same results as from the comparative samples #101 and #102 were obtained from comparative samples having the same configurations as the comparative samples #101 and #102 except that the liquid crystal polymers constituting the phase difference plates 2 and 3 were treated with a hybrid orientation technique.

The dependence of the transmittance versus applied voltage characteristics of liquid crystal on the inclination angle $\theta$ was examined by changing the inclination angle $\theta$ of the refractive index ellipsoid for the phase difference plates 2 and 3; it turned out that when the inclination angle $\theta$ was such that $15° \leq \theta \leq 75°$, the dependence did not basically alter regardless of the orientation state of the liquid crystal polymers of the phase difference plates 2 and 3. Note that it was found out that when the inclination angle $\theta$ was outside the range, the viewing angle in the opposite viewing direction did not widen.

Based on the results of visual inspections of the comparative samples #101 and #102, three comparative samples #9 to #11 were further prepared, the comparative samples #9 to #11 having the same configurations as the samples #6 to #8 except that liquid crystal materials having refractive index anisotropies $\Delta n(550)$ of 0.065, 0.100 and 0.115 respectively were used for the liquid crystal layer 8. These samples #9 to #11 were also placed in the measuring system shown in FIG. 7 to measure the output levels of the light receiving element 21 in response to voltages applied across the samples #9 to #11. The visual inspections were conducted of the samples #9 to #11 in white light.

The samples #10 and #11 produced good upward transmittance when the angle $\phi$ equaled 50°. By contrast, the sample #9 exhibited upward transmittance that initially decreased to a minimum value and then increased with higher voltages in a similar, however, more moderate manner than the comparative sample #101 (see FIG. 9). Therefore, the sample #9, although not producing as good transmittance as the samples #10 and #11, still could produce transmittance that was tolerable for real use.

In the visual inspections, the samples #10 and #11 exhibited yellow-to-orange coloration to the extent that did not pose any problem for real use. The sample #9 exhibited bluish coloration only to a small extent that did not pose any problem for real use.

As a supplement, a voltage of about 1 V was applied across the sample #9 and the comparative sample #101 to measure the transmittance in the normal direction to the surface of the liquid crystal cell 16 during white display. The comparative sample #101 exhibited a decrease in transmittance to the extent that was intolerable for real use, while the sample #9 exhibited a decrease in transmittance to an extent that was tolerable for real use.

As described so far, a liquid crystal display device having a basic configuration in accordance with the present embodiment includes:

a liquid crystal display element 1 including: a pair of glass substrates 9 and 12 including on the surfaces thereof facing each other transparent electrodes 10 and 13 and alignment films 11 and 14; and a liquid crystal layer 8 sandwiched between the glass substrates 9 and 12;

a pair of polarization plates 4 and 5 disposed so as to sandwich the liquid crystal display element 1; and at least one phase difference plate 2 (2 and 3) disposed between the liquid crystal display element 1 and the polarization plate 4 or 5, and having three principal refractive indices $n_a$, $n_b$, and $n_c$ pointing in three different directions that are orthogonal to each other, the principal refractive indices $n_a$, $n_b$, and $n_c$ being mutually related by the inequality $n_a<n_b<n_c$, the principal refractive index $n_b$ inclining to the normal to the surface of the phase difference plate 2, the principal refractive index $n_b$ and one of the other principal refractive indices $n_a$ and $n_c$ which is not parallel to the surface inclining clockwise or counterclockwise about the remaining principal refractive index $n_c$ or $n_a$ which is parallel to the surface, wherein the liquid crystal layer 8 is constituted by a liquid crystal material of which the refractive index anisotropy Δn is specified to vary with wavelengths of rays of light within a range that allows no viewing-angle dependent coloration to occur on the liquid crystal screen.

This restrains, in the liquid crystal display device, the phase difference of the liquid crystal display element 1 better than does the compensation function by the phase difference plates 2 and 3 alone. The viewing-angle dependent coloration of the liquid crystal screen is especially restrained better. Consequently, such a liquid crystal display device, including the phase difference plates 2 and 3 and the liquid crystal display element 1 can restrain the reversion phenomenon, the decrease in contrast ratio in the opposite viewing direction, and the coloration phenomenon.

The aforementioned range is, more specifically, such that Δn(450)−Δn(650), i.e. the difference between the refractive index anisotropy Δn(450) of the liquid crystal material for rays of light having the wavelength of 450 nm and the refractive index anisotropy Δn(650) thereof for rays of light having the wavelength of 650 nm, is not less than 0.0070 and not more than 0.0250. A more preferred range is such that Δn(450)−Δn(650) is not less than 0.0200 and not more than 0.0250.

Especially, by specifying Δn(450)−Δn(650) to be not less than 0.0070 and not more than 0.0250, the resultant liquid crystal display device, exhibiting coloration at the viewing angle of 50° which is typically required for liquid crystal display devices, however, achieves well restrained coloration to the extent that is up to standard for real use for any viewing direction.

Moreover, by specifying Δn(450)−Δn(650) to be not less than 0.0200 and not more than 0.0250, the resultant liquid crystal display device can carry out display that is totally free from the coloration phenomenon for any viewing direction at the viewing angle of 70° which is typically required for wide viewing-angle liquid crystal display devices.

As described here, the above-mentioned configuration can remarkably improve the quality of the images displayed by the liquid crystal display device, since the contrast ratio in black-and-white display is not affected by the viewing direction of a viewer.

Besides, in a liquid crystal display device having the aforementioned basic configuration and such a liquid crystal display device that Δn(450)−Δn(650) is set to be not less than 0.0070 and not more than 0.0250, since the refractive index anisotropy Δn(550) of the liquid crystal material for rays of light having the wavelength of 550 nm is set to be larger than 0.060 and smaller than 0.120, the phase difference that occurs to the liquid crystal display element 1 according to the viewing angle is eliminated. This is based on the aforementioned observations of decreases in the reversion phenomenon and contrast ratio for some viewing directions when the refractive index anisotropy Δn(550) of the liquid crystal material for rays of light having the wavelength of 550 nm that is the central range of the visible region of spectrum is set to be not more than 0.060 or not less than 0.120. Therefore, the contrast variations and reversion phenomenon in the left and right directions, not to mention the coloration phenomenon caused by the viewing-angle dependence, can be further restrained on the display screen.

With the liquid crystal display device thus configured, if the refractive index anisotropy Δn(550) of the liquid crystal material for rays of light having the wavelength of 550 nm is set to be not less than 0.070 and not more than 0.095, the contrast variations caused by the viewing-angle dependence and reversion phenomenon in the left and right directions can be even further restrained.

Among the liquid crystal display devices incorporating the aforementioned basic configuration, in such a liquid crystal display device that Δn(450)−Δn(650) is set to be not less than 0.0070 and not more than 0.0250 and such a liquid crystal display device that Δn(550) is set to be not less than 0.060 and not more than 0.120, since the inclination angle of the refractive index ellipsoid for all the phase difference plates is set in the range 15° to 75°, it becomes possible to ensure the compensation function of phase difference by the phase difference plates 2 and 3. Consequently, the visibility can be surely improved.

Second Embodiment

Referring to FIGS. 2, 7, and 10 through 16, the following description will discuss the second embodiment in accordance with the present invention. Here, for convenience, members of the second embodiment that have the same function as members of the first embodiment, and that are mentioned in the first embodiment are indicated by the same reference numerals and description thereof is omitted.

Figure 10:
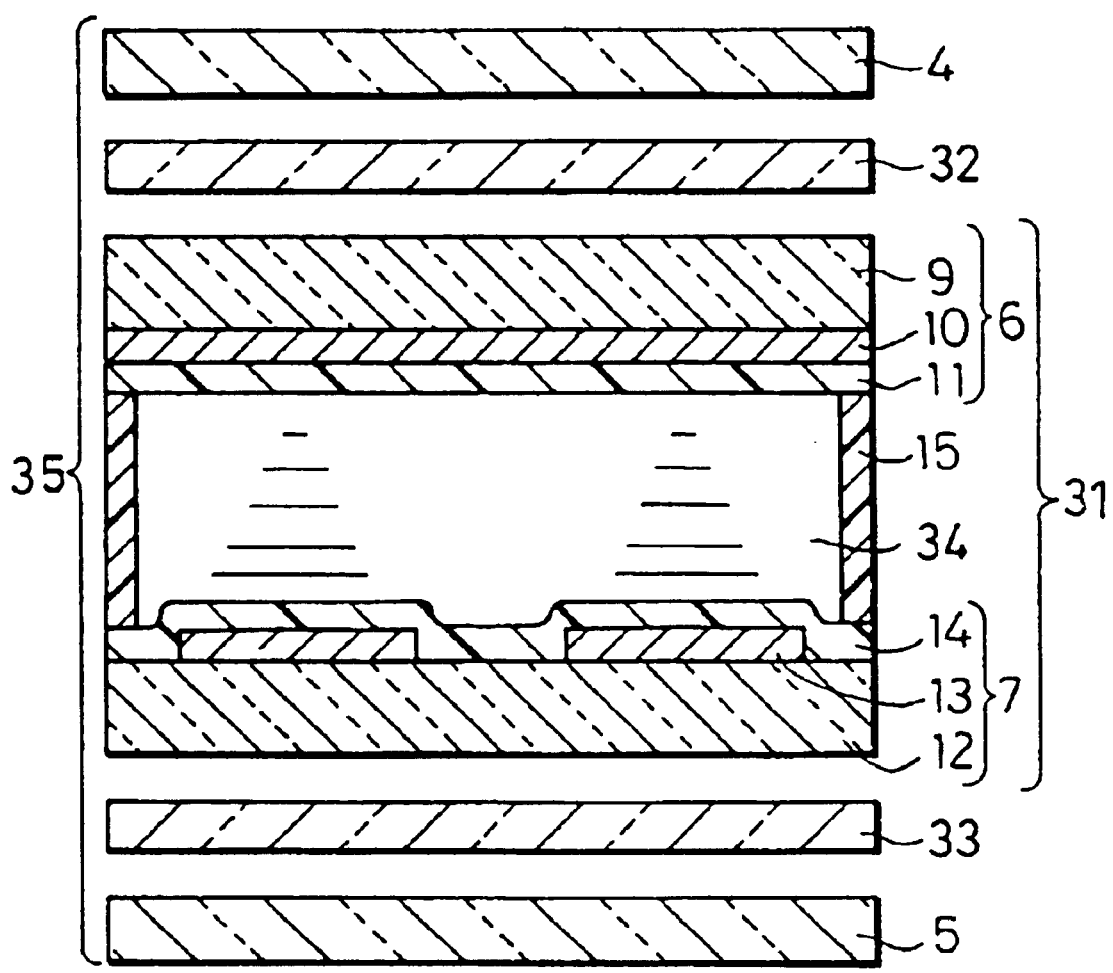
FIG. 10 is a cross-sectional view of a configuration of a liquid crystal display device of the second embodiment in accordance with the present invention, showing some components detached from others.

As illustrated in FIG. 10, the liquid crystal display device of the present embodiment is provided with a liquid crystal display element 31, a pair of phase difference plates 32 and 33, and a pair of polarization plates 4 and 5.

The liquid crystal display element 31 has the same configuration as the liquid crystal display element 1. However, a liquid crystal layer 34 made up of a liquid crystal material different from that for the liquid crystal layer 8 is sandwiched between the electrode substrates 6 and 7 that are placed face to face with each other. The liquid crystal material constituting the liquid crystal layer 34 is such that the refractive index anisotropy Δn thereof satisfies a predetermined condition to produce the best properties when combined with the compensation function of phase difference by the phase difference plates 32 and 33.

In the present liquid crystal display device, a unit, which is formed by incorporating the phase difference plates 32 and 33 and the polarization plates (polarizers) 4 and 5 into the above-mentioned liquid crystal display element 1, is referred to as a liquid crystal cell 35.

The phase difference plates 32 and 33 are provided between the liquid crystal display element 31 and the respective polarization plates 4 and 5 that are disposed so as to sandwich the liquid crystal display element 31. The phase difference plates 32 and 33 are constituted by a support base made up of a transparent organic high polymer and discotic liquid crystal provided on the support base. The discotic liquid crystal is treated with a horizontal orientation technique and crosslinked. The support base of the phase difference plates 32 and 33 is suitably made up of the same material as that for the phase difference plates 2 and 3.

Figure 11:
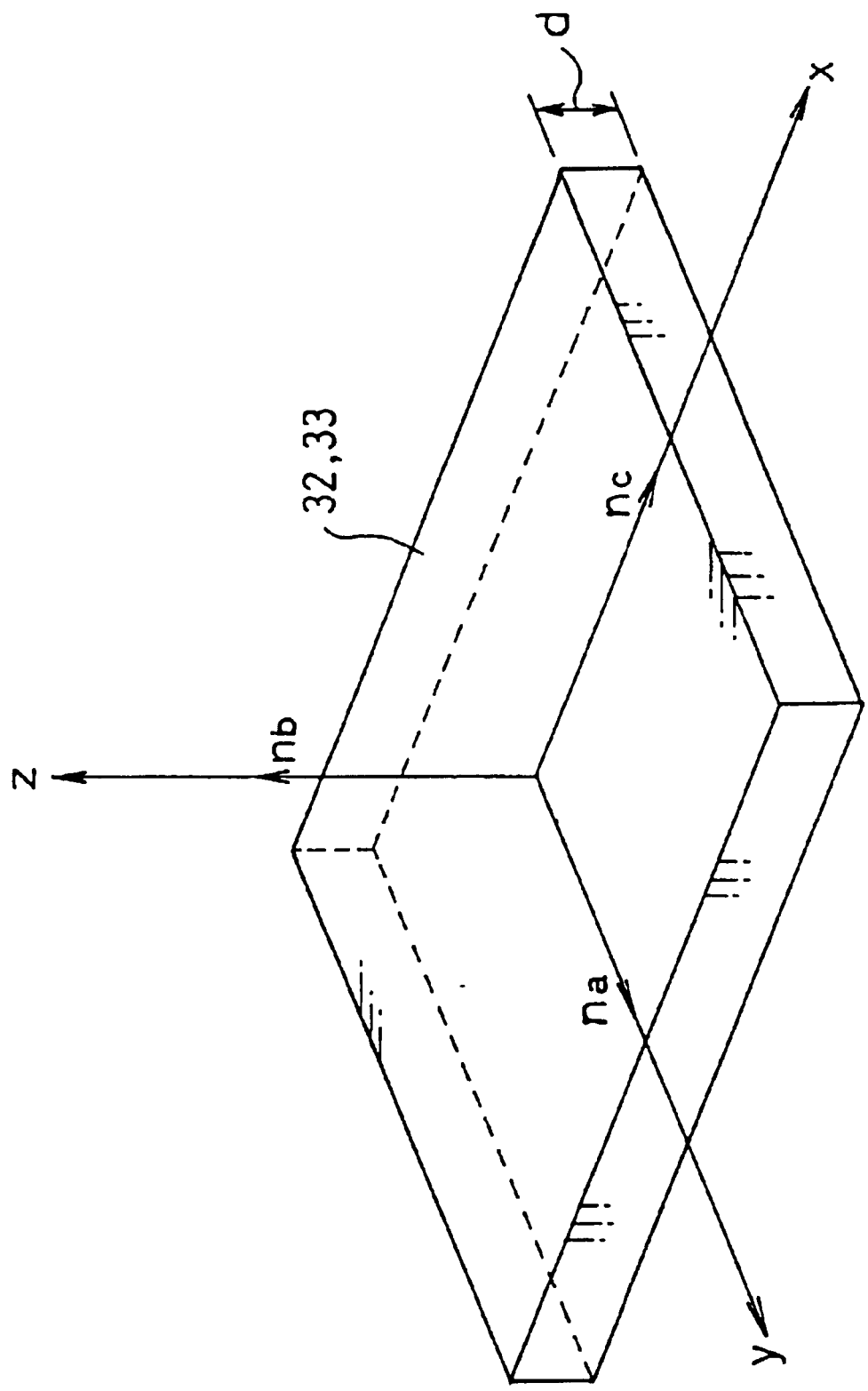
FIG. 11 is a perspective view illustrating principal refractive indices of a phase difference plate of the liquid crystal display device of FIG. 10.

As illustrated in FIG. 11, each of the phase difference plates 32 and 33 has principal refractive indexes $n_a$, $n_b$, and $n_c$ pointing in three different directions. The direction of the principal refractive index $n_a$ coincides with the direction of the y-coordinate axis among the x, y, and z-coordinate axes that are orthogonal to each other, while the direction of the principal refractive index $n_c$ coincides with the direction of the x-coordinate axis. The direction of the principal refractive index $n_b$ coincides with the direction of the z-coordinate axis (the direction normal to the surface) which is perpendicular to the surface corresponding to the display screen of the phase difference plates 32 and 33. That is, the refractive index ellipsoid does not incline with respect to the phase difference plates 32 and 33.

The principal refractive indices $n_a$, $n_b$, and $n_c$ of the phase difference plates 32 and 33 are such that $n_a = n_c > n_b$. Therefore, there exists only one optic axis, and the phase difference plates 32 and 33 have uniaxiality and a negative refractive index anisotropy. Since $n_a = n_c$, the phase difference plates 32 and 33 have a first retardation value $(n_c - n_a) \times d$ almost equal to 0 nm, and a second retardation value $(n_c - n_b) \times d$ specified arbitrarily in the range from 80 nm to 250 nm, where $(n_c - n_a)$ and $(n_c - n_b)$ each represent a refractive index anisotropy $\Delta n$, and d represents the thickness of the phase difference plates 32 and 33. By specifying the second retardation value $(n_c - n_b) \times d$ in that range, the compensation function of phase difference by the phase difference plates 32 and 33 is surely achieved.

Instead of using the two phase difference plates 32 and 33, one of them may be disposed on one side, or both of them are stacked together and disposed on one side. As a further alternative, three or more phase difference plates may be used.

Figure 12:
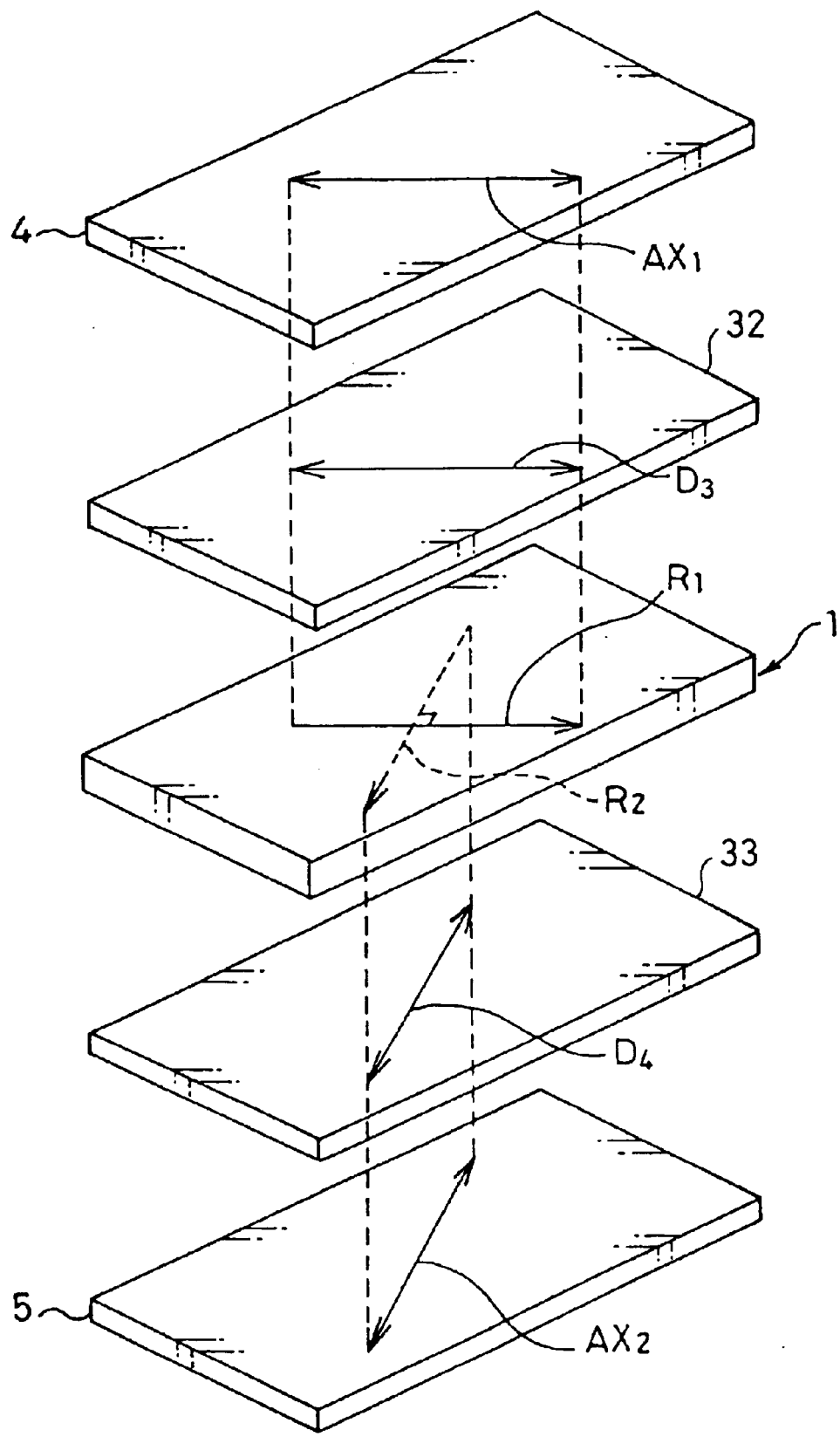
FIG. 12 is a perspective view illustrating an optical arrangement of polarization plates and phase difference plates of the liquid crystal display device of FIG. 10, showing each component separately from the others.

As illustrated in FIG. 12, in the present liquid crystal display device, the polarization plates 4 and 5 in the liquid crystal display element 31 are arranged so that their absorption axes $AX_1$ and $AX_2$ are respectively parallel to the rubbing directions $R_1$ and $R_2$ of the alignment films 11 and 14 (see FIG. 1). In the present liquid crystal display device, since the rubbing directions $R_1$ and $R_2$ are orthogonal to each other, the absorption axes $AX_1$ and $AX_2$ are also orthogonal to each other.

The phase difference plate 32 is placed so that direction $D_3$ of the principal refractive index $n_c$ thereof is parallel to the rubbing direction $R_1$, the phase difference plate 33 is placed so that direction $D_4$ of the principal refractive index $n_c$ thereof is parallel to the rubbing direction $R_2$.

With the above-mentioned arrangement of the phase difference plates 32 and 33 and the polarization plates 4 and 5, the present liquid crystal display device can carry out the so-called normally white display wherein rays of light are allowed to pass during off-time so that white display is provided.

Next, the liquid crystal layer 34 will be explained in detail.

As mentioned above, the liquid crystal layer 34 is made up of such a liquid crystal material that the refractive index anisotropy $\Delta n$ thereof satisfies a predetermined condition to produce the best properties when combined with the compensation function of phase difference by the phase difference plates 32 and 33: namely, the refractive index anisotropy $\Delta n$ is set in such a range that the variation in the refractive index anisotropy $\Delta n$ with wavelengths of rays do not cause viewing-angle-dependent coloration on the liquid crystal screen.

Specifically, the liquid crystal material for use is designed to meet the following condition on specification ranges.

$\Delta n(450) - \Delta n(650)$, i.e. the difference between the refractive index anisotropy $\Delta n(450)$ of the liquid crystal material for rays of light having the wavelength of 450 nm and the refractive index anisotropy $\Delta n(650)$ thereof for rays of light having the wavelength of 650 nm, is set in a range not less than 0 to less than 0.0090. The difference is more preferably set in a range not less than 0 to not more than 0.0045.

By using a liquid crystal material designed to meet such a condition, not only the restraint in the contrast variations, coloration phenomenon, and reversion phenomenon caused by the viewing-angle dependence of the display screen by the compensation function of phase difference by the phase difference plates 32 and 33, but the coloration phenomenon of the display screen not caused by the viewing-angle dependence is also restrained.

More specifically, if a liquid crystal material designed so as to satisfy the above-mentioned wider range is used, the resultant liquid crystal display device, exhibiting coloration at the viewing angle of 50° which is typically required for liquid crystal display devices, however, can display images that are up to standard for real use for any viewing direction.

Especially, by satisfying the above-mentioned more preferable range, the resultant liquid crystal display device is free from any coloration for any viewing direction at the viewing angle of 70°.

Besides, by using a liquid crystal material designed to meet the condition, the contrast variations and reversion phenomenon are better restrained than only by the compensation function by the phase difference plates 32 and 33.

Moreover, in the present liquid crystal display device, the condition below is preferably met as well as the aforementioned condition. For such a case, more specifically, the following condition is satisfied in the liquid crystal layer 34.

The refractive index anisotropy $\Delta n(550)$ of the liquid crystal material for rays of light having the wavelength of 550 nm should be set to be larger than 0.060 and smaller than 0.120. More preferably, the refractive index anisotropy $\Delta n(550)$ should be set to be not less than 0.070 and not more than 0.095.

By meeting such an additional condition, it becomes possible to restrain not only the viewing-angle dependence with the compensation function of phase difference by the phase difference plates 32 and 33 and with the compensation function based on the aforementioned range condition on the difference between the refractive index anisotropies $\Delta n$, but also the decrease in contrast ratio in the opposite viewing direction and the reversion phenomenon in the left and right directions.

Figure 13:
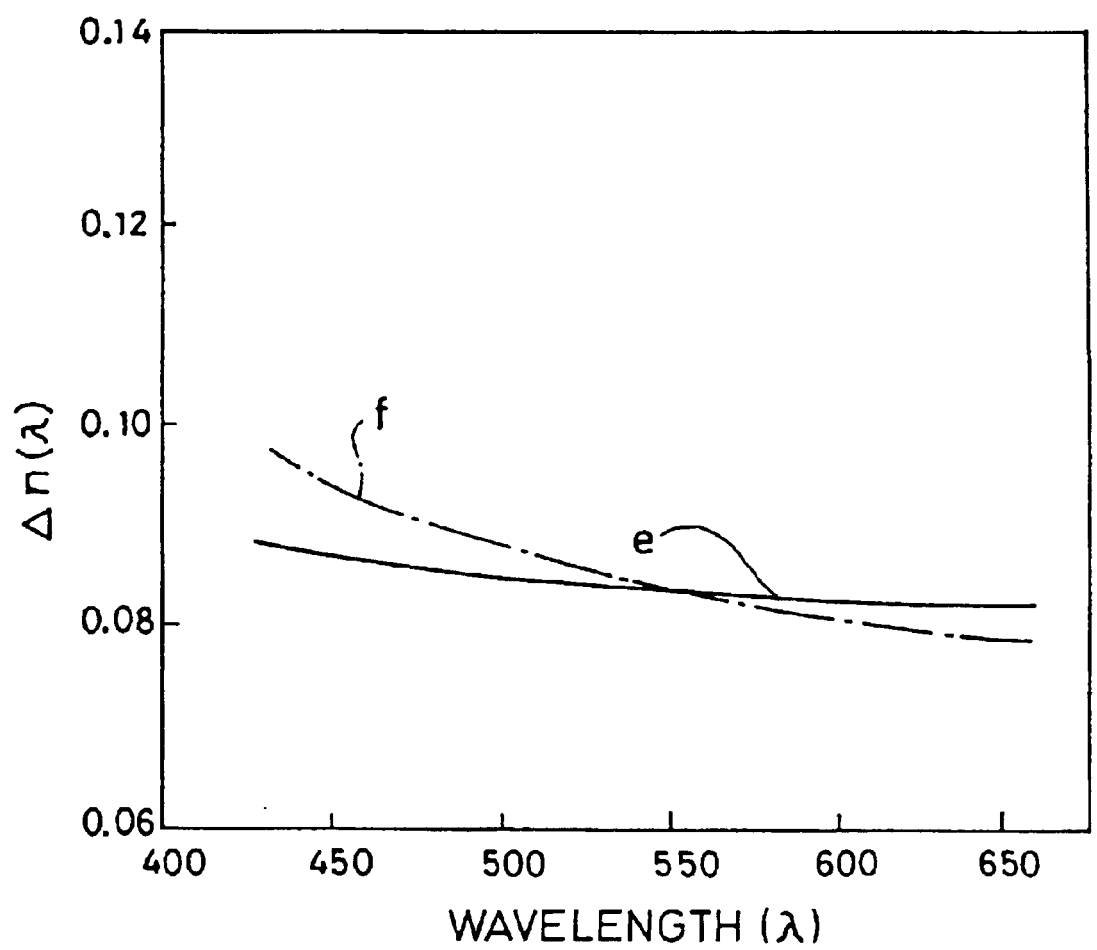
FIG. 13 is a graphical representation of refractive index anisotropy $\Delta n$ versus wavelength of a liquid crystal material used for a liquid crystal layer of the liquid crystal display device of FIG. 10.

FIG. 13 shows, in a solid curve e, $\Delta n(\lambda)$ against wavelengths ($\lambda$), i.e. refractive index anisotropy $\Delta n$ versus wavelength characteristics, of a liquid crystal material usable for the liquid crystal layer 34 of the present liquid crystal display device. For the purpose of comparison, FIG. 13 also shows, in an alternate long and short dash curve f, $\Delta n(\lambda)$ against wavelengths ($\lambda$) of a liquid crystal material conventionally used for the liquid crystal layer of a liquid crystal display device.

The curve e shows an almost flat overall profile, falling slightly with higher wavelengths ($\lambda$). It can be understood from the comparison of the curves e and f that the slope of the refractive index anisotropy Δn versus wavelength characteristics of the present liquid crystal display device is less sharp than that of the refractive index anisotropy Δn versus wavelength characteristics of a conventional liquid crystal display device.

Figure 14:
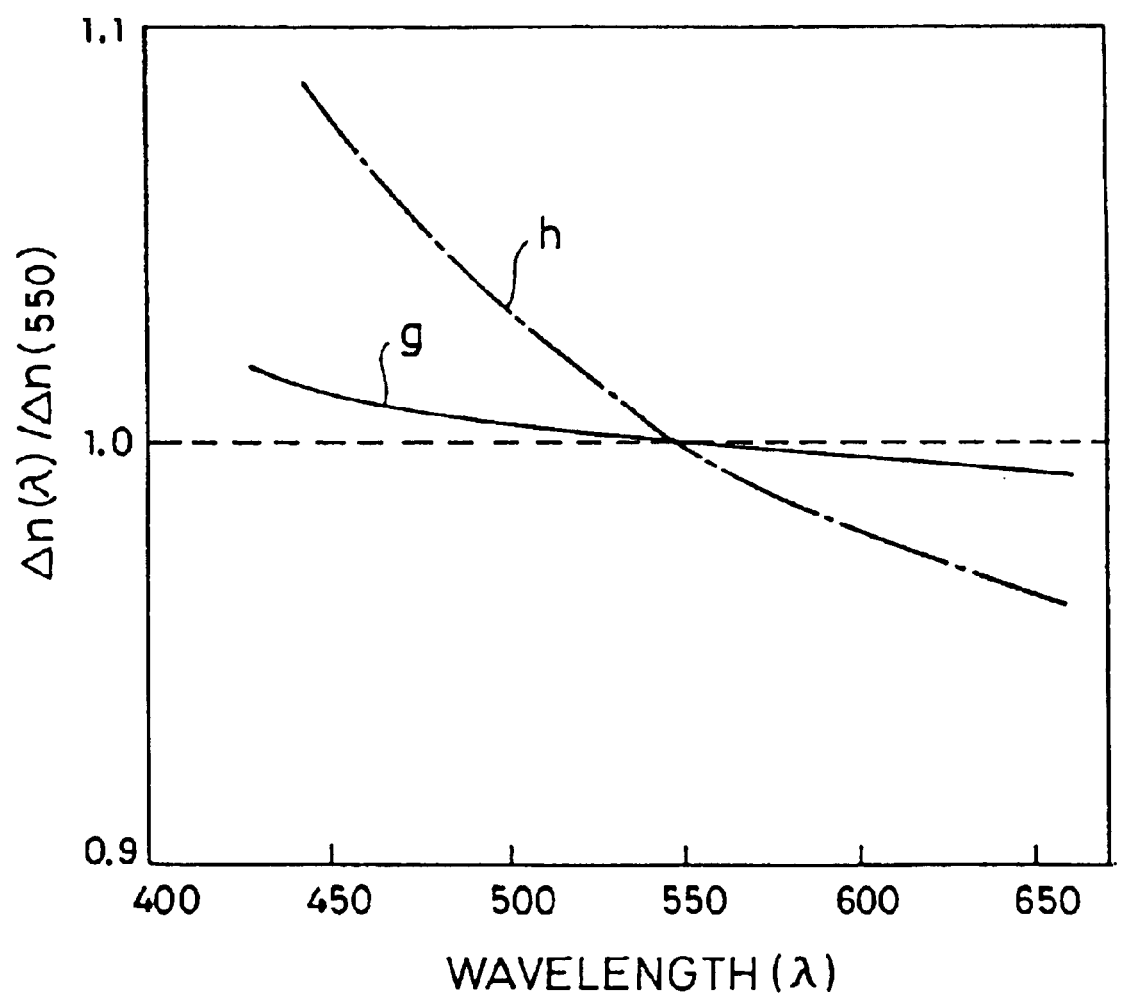
FIG. 14 is a graphical representation of $\Delta n(\lambda)/\Delta n(550)$ versus wavelength of a liquid crystal material used for a liquid crystal layer of the liquid crystal display device of FIG. 10.
Figure 15:
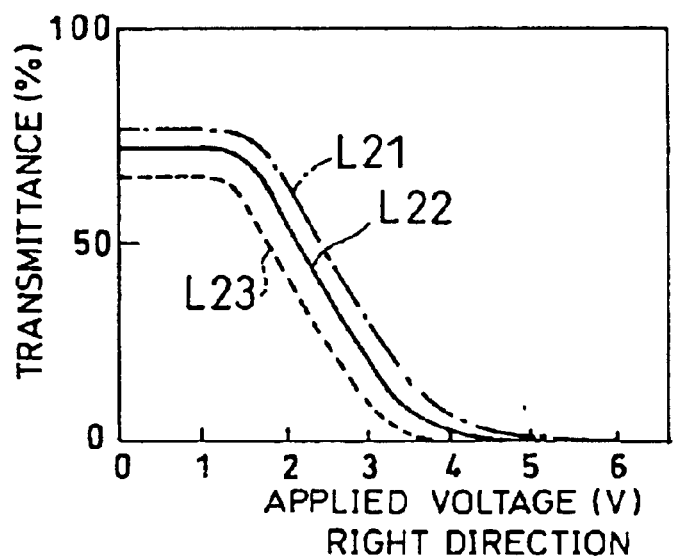
FIG. 15(a) is a graphical representation showing transmittance versus applied voltage characteristics of the liquid crystal of a liquid crystal display device of the first example of the second embodiment, when the liquid crystal display device is viewed from the right side thereof.
FIG. 15(b) is a graphical representation showing transmittance versus applied voltage characteristics of the liquid crystal of a liquid crystal display device of the first example of the second embodiment, when the liquid crystal display device is viewed from the left side thereof.
Figure 15:
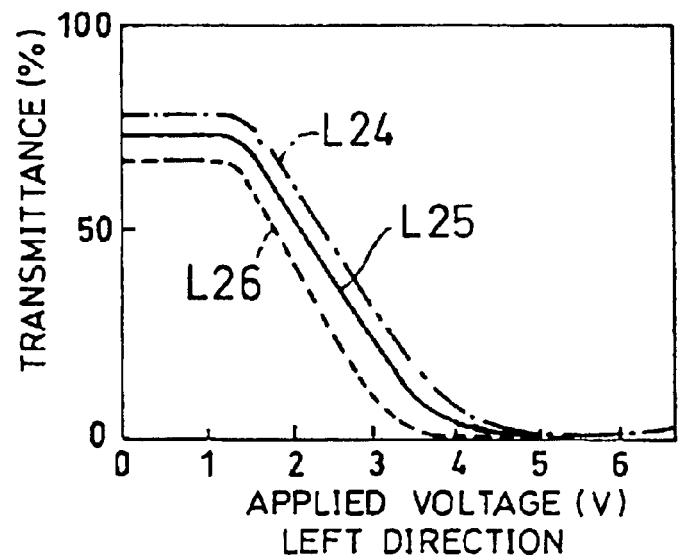
Figure 16:
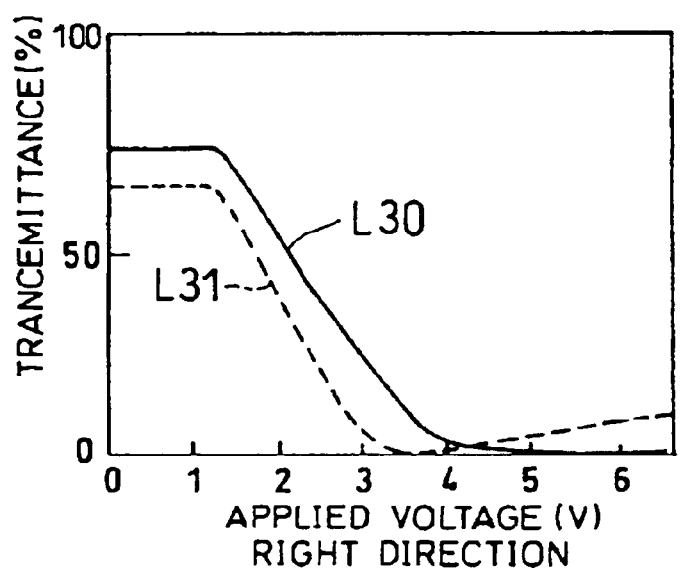
FIG. 16(a) is a graphical representation showing transmittance versus applied voltage characteristics of the liquid crystal of a liquid crystal display device of a comparative example for the first example of the second embodiment, when the liquid crystal display device is viewed from the right side thereof.
FIG. 16(b) is a graphical representation showing transmittance versus applied voltage characteristics of the liquid crystal of a liquid crystal display device of a comparative example for the first example of the second embodiment, when the liquid crystal display device is viewed from the left side thereof.
Figure 16:
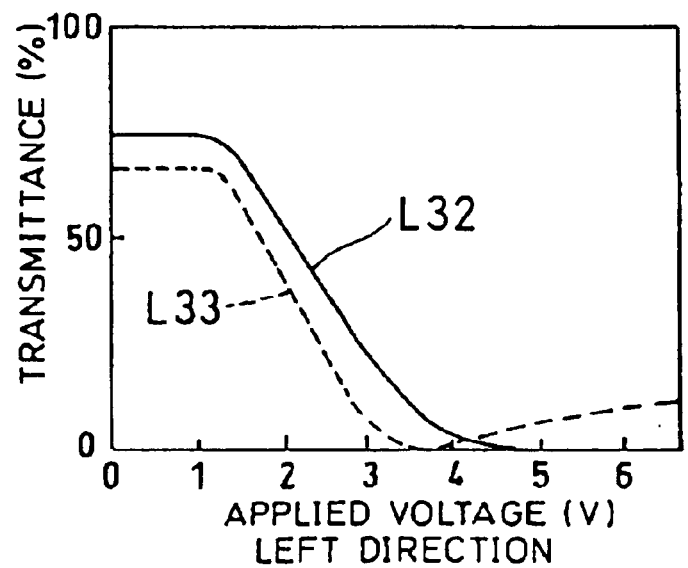
Figure 17:
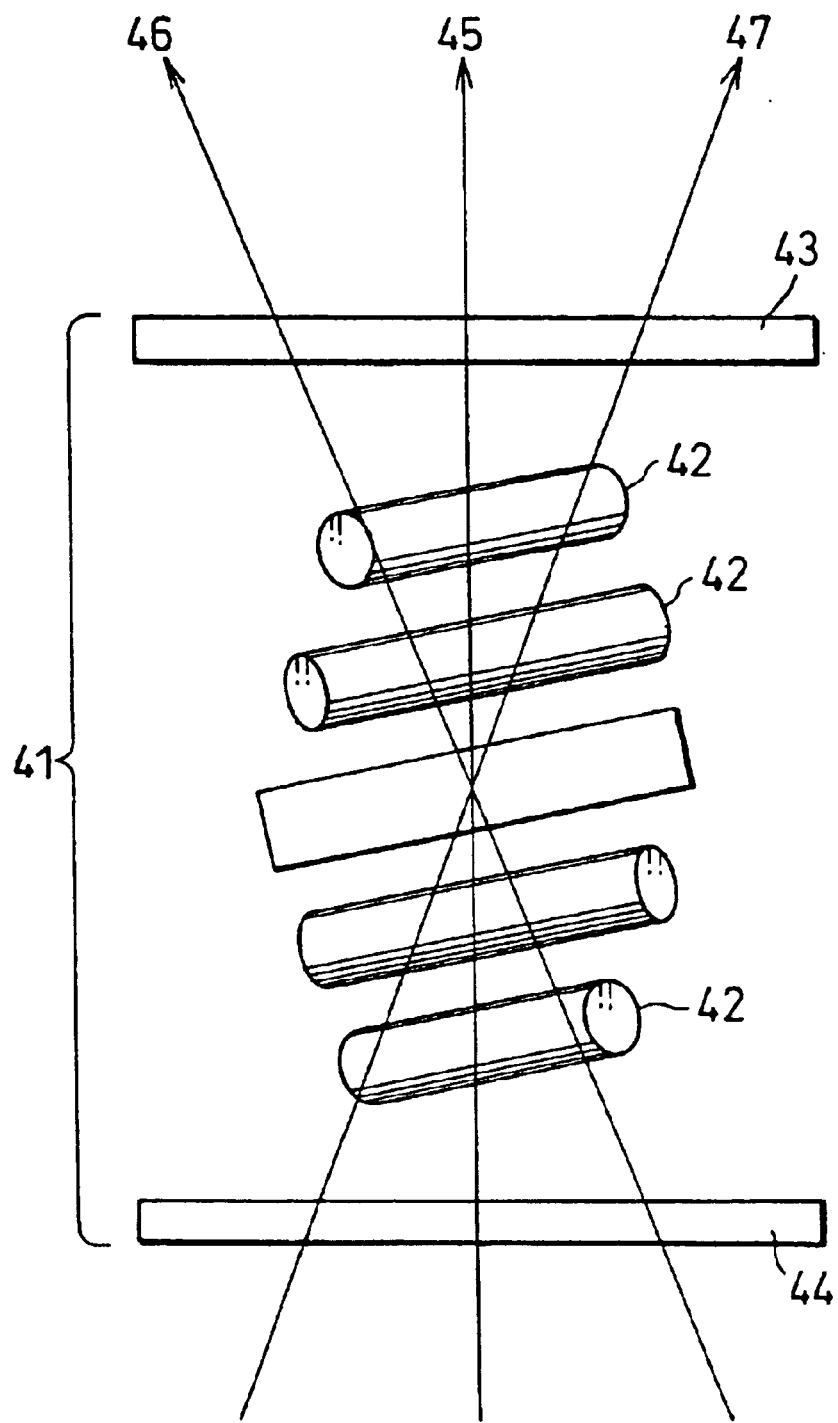
FIG. 17 is a schematic drawing illustrating the twisted orientation of liquid crystal molecules in a TN liquid crystal display element.

FIG. 14 shows, in a solid curve g, Δn(λ)/Δn(550) against wavelengths (λ) of another liquid crystal material usable for the liquid crystal layer 34 of the present liquid crystal display device. For the purpose of comparison, FIG. 14 also shows, in an alternate long and short dash curve h, Δn(λ)/Δn(550) against wavelengths (λ) of a liquid crystal material conventionally used for the liquid crystal layer of a liquid crystal display device.

It can be understood from the comparison of the curves g and h that the slope depicting the changes in Δn(λ)/Δn(550) of the present liquid crystal display device is also less sharp than that depicting the changes in Δn(λ)/Δn(550) of a conventional liquid crystal display device.

The liquid crystal display device of the present embodiment configured in this manner has a compensation function by the phase difference plates 32 and 33 for a phase difference that occurs to the liquid crystal display element 31 in accordance with the viewing angle, and a compensation function based on such a specification of the variations in the refractive index anisotropy an with wavelengths of rays of light passing through the liquid crystal material in the liquid crystal layer 34 as to fall in a range where no coloration occurs on the liquid crystal screen. Since this properly restrains the contrast variations, coloration phenomenon, and reversion phenomenon caused by the viewing-angle dependence, images can be displayed in high quality.

Next, the following description will explain examples of the present embodiment configured as above, together with a comparative example.

EXAMPLE 1

In the present example, five samples #21 to #25, each having a cell gap (the thickness of the liquid crystal layer 34) set to 5 μm, were used as samples of the liquid crystal display device shown in FIG. 10. Δn(450)–Δn(650), i.e. the difference between the refractive index anisotropy Δn(450) of the liquid crystal material constituting the liquid crystal layer 34 for the wavelength of 450 nm and the refractive index anisotropy Δn(650) thereof for the wavelength of 650 nm, was set to 0, 0.0030, 0.0045, 0.0055, and 0.0070 for the samples #21 to #25 respectively.

The phase difference plates 32 and 33 of the samples #21 to #25 were each constituted by a transparent support base (e.g. triacetylcellulose (TAC)) and discotic liquid crystal that was provided on the support base, treated with a horizontal orientation technique, and crosslinked. The first and second retardation values of the phase difference plates 32 and 33 were respectively set to 0 nm and 100 nm.

A comparative sample #200 was prepared as a comparative example for the present example, the comparative sample #200 having the same configuration as the present example except that a liquid crystal material of Δn(450)–Δn(650)=0.0090 was used for the liquid crystal layer 34 of the liquid crystal display device shown in FIG. 10.

Table 2 shows results of visual inspections of the samples #21 to #25 and the comparative sample #200 in white light.

TABLE 2

| Viewing Angles (θ) | Δn(450) − Δn(650) (× $10^{-3}$) | | | | | |
|---|---|---|---|---|---|---|
| | 0 #21 | 3.0 #22 | 4.5 #23 | 5.5 #24 | 7.0 #25 | 9.0 #200 |
| 50° | E | E | E | E | G | NG |
| 60° | E | E | E | G | NG | NG |
| 70° | E | E | E | NG | NG | NG |

In Table 2, E stands for "Excellent" and indicates that no coloration was observed, G stands for "Good" and indicates that coloration was observed to the extent that did not pose any problem for real use, and NG stands for "No Good" and indicates that coloration was so evident as to be intolerable for real use.

The samples #21 to #23 of the example produced good image quality with no coloration observed at all from any viewing direction at the viewing angle of 70°. The sample #24 produced good image quality with no coloration observed at all from any viewing direction at the viewing angle of 50°, and exhibited a little coloration when viewed from the left and right directions at the viewing angle of 60°, but the coloration was only to an extent that was tolerable for real use. The sample #25 also exhibited a little coloration when viewed from the left and right directions at the viewing angle of 50°, but the coloration was also only to an extent that was tolerable for real use.

By contrast, the comparative sample #200 exhibited yellow-to-orange coloration to the extent that was intolerable for real use when viewed from the left and right directions even at the viewing angle of 50°.

EXAMPLE 2

Similarly to the second example of the first embodiment, the measuring system illustrated in FIG. 7 was used to measure the viewing-angle dependence of the liquid crystal display device. The liquid crystal cell 35 of the liquid crystal display device is placed so that the surface 35a thereof facing the glass substrate 9 is located on the reference surface x-y of the rectangular coordinates x, y and z.

During the measuring process, monochromatic light with a wavelength of 550 nm is directed to the liquid crystal cell 35 installed in the present measuring system through a surface of the liquid crystal cell 35 that is opposite to the surface 35a. One part of the monochromatic light that has passed through the liquid crystal cell 35 is made incident on the light-receiving element 21. The output of the light-receiving element 21, after having been amplified to a predetermined level by the amplifier 22, is recorded by the recording device 23 such as a waveform memory or a recorder.

In the present example, three samples #26 to #28, each having a cell gap set to 5 μm, were used. The refractive index anisotropy Δn(550) of the liquid crystal material constituting the liquid crystal layer 34 in the liquid crystal cell 35 shown in FIG. 10 for the wavelength of 550 nm were set to 0.070, 0.080 and 0.095 for the samples #26 to #28 respectively. The phase difference plates 32 and 33 of the samples #26 to #28 were the same as those of the aforementioned first example in which the discotic liquid crystal was treated with a horizontal orientation technique.

These samples #26 to #28 were placed in the measuring system shown in FIG. 7 to measure the output levels of the light receiving element 21 fixed at a constant angle φ in response to voltages applied across the samples #26 to #28.

The measurement was done with the light receiving element 21 disposed so that the angle φ equaled 50° and moved between the right and left directions, on the presumption that the y direction is toward the left side of the display screen and the x direction is toward the bottom side of the display screen.

The results of the measurement are plotted in the graphs of FIGS. 15(a) and 15(b) as transmittances of light against voltages applied across the samples #26 to #28 (transmittance versus applied voltage characteristics), FIG. 15(a) showing the results of the measurement done from the right direction of FIG. 2, and FIG. 15(b) showing the results of the measurement done from the left direction of FIG. 2.

In FIGS. 15(a) and 15(b), the alternate long and short dash curves L21 and L24 represent the characteristics of the sample #26, the solid curves L22 and L25 represent the characteristics of the sample #27, and the broken curves L23 and L26 represent the characteristics of the sample #28.

Two comparative samples #201 and #202 were prepared as a comparative example for the present example, the comparative samples #201 and #202 having the same configurations as the samples #26 to #28 except that liquid crystal materials having refractive index anisotropies Δn(550) for the wavelength of 550 nm set to 0.060 and 0.120 respectively were used for the liquid crystal layer 34 of the liquid crystal cell 35 shown in FIG. 10. In the same manner as the present example, these comparative samples #201 and #202 were placed in the measuring system shown in FIG. 7 to measure the output levels of the light receiving element 21 fixed at a constant angle φ in response to voltages applied across the comparative samples #201 and #202.

The measurement was done with the light receiving element 21 disposed so that the angle φ equaled 50° and moved between the right and left directions.

The results of the measurement are plotted in the graphs of FIGS. 16(a) and 16(b) as transmittances of light against voltages applied across the comparative samples #201 and #202 (transmittance versus applied voltage characteristics), FIG. 16(a) showing the results of the measurement done from the right direction of FIG. 2, and FIG. 16(b) showing the results of the measurement done from the left direction of FIG. 2.

In FIGS. 16(a) and 16(b), the solid curves L30 and L32 represent the characteristics of the comparative sample #201, and the broken curves L31 and L33 represent the characteristics of the comparative sample #202.

The samples #26 to #28 of the present example were compared with the comparative samples #201 and #202 of the comparative example with respect to the right-direction transmittance versus applied voltage characteristics. As illustrated by the curves L21 to L23 in FIG. 15(a), the transmittance of the samples #26 to #28 decreased almost to zero with higher voltages applied across the samples #26 to #28. As illustrated by the curve L30 in FIG. 16(a), similarly to FIG. 15(a), the transmittance of the comparative sample #201 decreased almost to zero with higher voltages applied across the comparative sample #201. By contrast, as illustrated by L31, the transmittance of the comparative sample #202 exhibited the reversion phenomenon, increasing with higher voltages applied across the comparative sample #202 after the initial drop.

Similar results were obtained from the comparison of the samples #26 to #28 and the comparative sample #201 with respect to the left-direction transmittance versus applied voltage characteristics. As illustrated by the curves L24 to L26 in FIG. 15(b) and the curve L32 in FIG. 16(b), the transmittance of the samples #26 to #28 decreased almost to zero with higher voltages applied across the samples #26 to #28 and the comparative sample #201. By contrast, as illustrated by L33 in FIG. 16(b), the transmittance of the comparative sample #202 exhibited the reversion phenomenon, increasing with higher voltages applied across the comparative sample #202 after the initial drop.

Visual inspections were conducted for the samples #26 to #28 and the comparative samples #201 and #202 in white light.

The samples #26 and #28 of the present example produced good transmittance with no coloration observed at all from any viewing direction at the angle φ equal to 50°. By contrast, the comparative samples #201 and #202 exhibited yellow-to-orange coloration when viewed from the left and right directions at the angle φ equal to 50°.

The characteristics shown in FIGS. 15(a) and 15(b) clearly tell that the viewing angle widened when liquid crystal materials having refractive index anisotropies Δn(550) for the wavelength of 550 nm set to 0.070, 0.080 and 0.095 respectively were used for the liquid crystal layer 34 as mentioned above, because the transmittance decreased by substantial amounts with higher voltages and no reversion phenomenon occurred. The specifications eliminate coloration too. Therefore it is possible to improve the display quality remarkably with the present liquid crystal display device, compared with conventional liquid crystal display devices.

On the other hand, the characteristics shown in FIGS. 16(a) and 16(b) tell that the viewing-angle dependence is not restrained sufficiently when liquid crystal materials having refractive index anisotropies Δn(550) for the wavelength of 550 nm set to 0.060 and 0.120 respectively were used for the liquid crystal layer 34.

Using the samples #26 to #28 of the present example, the dependence of the transmittance versus applied voltage characteristics of liquid crystal on the second retardation value was examined by changing the second retardation value of the phase difference plates 32 and 33; it turned out that when the second retardation value was in a range of 80 nm to 250 nm, the transmittance versus applied voltage characteristics remained almost the same. By contrast, when the second retardation value was outside the range, the viewing angle in the horizontal direction (left-to-right direction) did not widen.

Based on the results of visual inspections of the comparative samples #201 and #202, three comparative samples #29 to #31 were further prepared, the comparative samples #29 to #31 having the same configurations as the samples #26 to #28 except that liquid crystal materials having refractive index anisotropies Δn(550) for the wavelength of 550 nm of 0.065, 0.100 and 0.115 respectively were used for the liquid crystal layer 34. These samples #29 to #31 were also placed in the measuring system shown in FIG. 7 to measure the output levels of the light receiving element 21 in response to voltages applied across the samples #29 to #31. The visual inspections were conducted of the samples #29 to #31 in white light.

The sample #30 (Δn(550)=0.100) and the sample #31 (Δn(550)=0.115) exhibited a slight increase in transmittance in the right and left directions with higher applied voltages when the angle φ equaled 50°. However, no reversion phenomenon was visually observed, and the increase in transmittance occurred only to an extent that was tolerable for real use. Meanwhile, no problem was found with the sample #29 ($\Delta n(550)=0.065$) in the right and left directions.

In the visual inspections, the samples #30 and #31 exhibited yellow-to-orange coloration to the extent that did not pose any problem for real use. The sample #29 exhibited bluish coloration only to a small extent that did not pose any problem for real use.

As a supplement, a voltage of about 1 V was applied across the sample #29 and the comparative sample #201 to measure the transmittance in the normal direction to the surface of the liquid crystal cell 35 during white display. The comparative sample #201 exhibited a decrease in transmittance to the extent that was intolerable for real use, while the sample #29 exhibited a slight decrease in transmittance to an extent that was tolerable for real use.

As described so far, a liquid crystal display device in accordance with the present embodiment includes:

a liquid crystal display element 31 including: a pair of glass substrates 9 and 12 including on the surfaces thereof facing each other transparent electrodes 10 and 13 and alignment films 11 and 14; and a liquid crystal layer 34 sandwiched between the glass substrates 9 and 12;

a pair of polarization plates 4 and 5 disposed so as to sandwich the liquid crystal display element 31; and phase difference plates 32 and 33 disposed between the liquid crystal display element 31 and the polarization plates 4 and 5 disposed so as to sandwich the liquid crystal display element 31, and having three principal refractive indices $n_a$, $n_b$, and $n_c$ being such that $n_a=n_c>n_b$, the principal refractive indices $n_a$ and $n_c$ being parallel to the surfaces of the phase difference plates 32 and 33, the principal refractive index $n_b$ being parallel to the normal to the surfaces, wherein the liquid crystal layer 34 is constituted by a liquid crystal material of which the refractive index anisotropy $\Delta n$ is specified to vary with wavelengths of rays of light within a range that allows no viewing-angle dependent coloration to occur on the liquid crystal screen.

This restrains, in the liquid crystal display device, the phase difference of the liquid crystal display element 31 better than does the compensation function by the phase difference plates 32 and 33 alone. The viewing-angle dependent coloration of the liquid crystal screen is especially restrained better. Consequently, such a liquid crystal display device, including the phase difference plates 32 and 33 and the liquid crystal display element 31 can restrain the reversion phenomenon, the decrease in contrast ratio in the opposite viewing direction, and the coloration phenomenon.

The aforementioned range is, more specifically, such that $\Delta n(450)-\Delta n(650)$, i.e. the difference between the refractive index anisotropy $\Delta n(450)$ of the liquid crystal material for rays of light having the wavelength of 450 nm and the refractive index anisotropy $\Delta n(650)$ thereof for rays of light having the wavelength of 650 nm, is not less than 0 and less than 0.0090. A more preferred range is such that $\Delta n(450)-\Delta n(650)$ is not less than 0 and not more than 0.0045.

Especially, by specifying $\Delta n(450)-\Delta n(650)$ to be not less than 0 and less than 0.0090, the resultant liquid crystal display device, exhibiting coloration at the viewing angle of 50° which is typically required for liquid crystal display devices, however, achieves well restrained coloration to the extent that is up to standard for real use for any viewing direction.

Moreover, by specifying $\Delta n(450)-\Delta n(650)$ to be not less than 0 and not more than 0.0045, the resultant liquid crystal display device can carry out display that is totally free from the coloration phenomenon for any viewing direction at the viewing angle of 70° which is typically required for wide viewing-angle liquid crystal display devices.

As described here, the above-mentioned configuration can remarkably improve the quality of the images displayed by the liquid crystal display device, since the contrast ratio in black-and-white display is not affected by the viewing direction of a viewer.

Besides, in a liquid crystal display device having the aforementioned basic configuration and such a liquid crystal display device that $\Delta n(450)-\Delta n(650)$ is set to be not less than 0 and less than 0.0090, since the refractive index anisotropy $\Delta n(550)$ of the liquid crystal material for rays of light having the wavelength of 550 nm is set to be larger than 0.060 and smaller than 0.120, the phase difference that occurs to the liquid crystal display element 31 according to the viewing angle is eliminated. This is, as mentioned in the first embodiment, based on the observations of decreases in the reversion phenomenon and contrast ratio for some viewing directions when the refractive index anisotropy $\Delta n(550)$ of the liquid crystal material for rays of light having the wavelength of 550 nm is set to be not more than 0.060 or not less than 0.120. Therefore, the contrast variations and reversion phenomenon in the left and right directions, as well as the coloration phenomenon caused by the viewing-angle dependence, can be further restrained on the liquid crystal screen.

This eliminates the phase difference that happens to the liquid crystal display element depending upon the viewing angle. Therefore, the contrast variations and reversion phenomenon in the left and right directions, not to mention the coloration phenomenon caused by the viewing-angle dependence, can be further restrained on the display screen.

With the liquid crystal display device thus configured, if the refractive index anisotropy $\Delta n(550)$ of the liquid crystal material for rays of light having the wavelength of 550 nm is set to be not less than 0.070 and not more than 0.095, the contrast variations caused by the viewing-angle dependence and reversion phenomenon in the left and right directions can be even further restrained.

In the liquid crystal display devices incorporating the aforementioned basic configuration, $(n_a-n_b) \times d$, i.e. the difference between the principal refractive indices $n_a$ and $n_b$ multiplied by the thickness d of the phase difference plates, is preferably specified in the range from 80 nm to 250 nm. With such a specification, it becomes possible to ensure the compensation function of phase difference by the phase difference plates 32 and 33. Consequently, the visibility of the liquid crystal display device can be surely improved.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A liquid crystal display device, comprising:
   a liquid crystal display element including:
      a pair of substrates,
      a liquid crystal layer sandwiched by said substrates;
   a pair of polarizers disposed so as to sandwich said liquid crystal display element; and
   at least one phase difference plate, each of said at least one phase difference plate defining a surface and being disposed between said liquid crystal display element and said pair of polarizers;

wherein (i) each of said at least one phase difference plate has three principal refractive indices $n_a$, $n_b$, and $n_c$, (ii) said refractive indices are mutually related by the inequality $n_a<n_b<n_c$, (iii) the direction of said principal refractive index $n_a$ coincides with the direction of a y-coordinate axis among x and y-coordinate axes on said surface, said y-coordinate axis being orthogonal to said normal, and (iv) the direction of said principal refractive index $n_b$ inclines relative to the normal to said surface and to the direction of said x-coordinate axis, and wherein the refractive index anisotropy $\Delta n$ (550) of said liquid crystal material for rays of light having the wavelength of 550 nm is specified to be more than 0.060 and less than 0.120, and wherein the refractive index anisotropy of said liquid crystal material varies with other wavelengths of rays of light within a range that allows substantially no viewing angle dependent coloration to occur in an image displayed by said device.

2. The liquid crystal display device as defined in claim 1, wherein the refractive index anisotropy $\Delta n$ (550) is specified to be not less than 0.065 and not more than 0.115.

3. The liquid crystal display device as defined in claim 2, wherein the refractive index anisotropy $\Delta n$(550) is specified to be not less than 0.070 and not more than 0.095.

4. The liquid crystal display device as defined in claim 1, wherein the inclination angle of the principal refractive index $n_b$ of the phase difference plate is specified to be in the range from 15° to 75°.

5. A liquid crystal display device, comprising:
   a liquid crystal display element including:
      a pair of substrates,
      a liquid crystal layer sandwiched by said substrates;
      a pair of polarizers disposed so as to sandwich said liquid crystal display element; and
      at least one phase difference plate, each of said at least one phase difference plate defining a surface and being disposed between said liquid crystal display element and said pair of polarizers;
      wherein each of said at least one phase difference plate (i) has three principal refractive indices $n_a$, $n_b$, and $n_c$, (ii) said refractive indices are mutually related by the inequality $n_a<n_b<n_c$, (iii) the direction of said principal refractive index $n_a$ coincides with the direction of a y-coordinate axis among x and y-coordinate axes on said surface, said y-coordinate axis being orthogonal to said normal, and (iv) the direction of the principal refractive index $n_b$ inclines relative to the normal to said surface and to the direction of said x-coordinate axis, and wherein (i) the refractive index anisotropy $\Delta n$ (550) of the liquid crystal material for rays of light having the wavelength of 550 nm is specified to be more than 0.060 and less than 0.120, (ii) $\Delta n$ (450)–$\Delta n$ (650), i.e., the difference between the refractive index anisotropy $\Delta n$ (450) of the liquid crystal material for rays of light having a wavelength of 450 nm and the refractive index anisotropy $\Delta n$ (650) thereof for rays of light having the wavelength of 650 nm, is specified to be not less than 0.0070 and not more than 0.0250, and (iii) the refractive index anisotropy of said liquid crystal material varies with other wavelengths of rays of light within a range that allows substantially no viewing angle dependent coloration to occur in an image displayed by said device.

6. The liquid crystal display device defined in claim 5, wherein $\Delta n$(450)–$\Delta n$(650) is specified to be not less than 0.0200 and not more than 0.0250.

7. The liquid crystal display device as defined in claim 5, wherein the inclination angle of the principal refractive index $n_b$ of the phase difference plate is specified to be in the range from 15° to 75°.

8. The liquid crystal display device as defined in claim 7, wherein the optical phase difference plate includes:
   a support base composed of a transparent organic high polymer; and
   a liquid crystal polymer layer formed on the support base to be aligned to possess hybrid orientation and crosslinked.

9. The liquid crystal display device as defined in claim 5, wherein the refractive index anisotropy $\Delta n$ (550) is specified to be not less than 0.065 and not more than 0.115.

10. The liquid crystal display device as defined in claim 9, wherein the refractive index anisotropy $\Delta n$ (550) is specified to be not less than 0.070 and not more than 0.095.

11. The liquid crystal display device as defined in claim 5, wherein the optical phase difference plate includes:
   a support base composed of a transparent organic high polymer; and
   a liquid crystal polymer layer formed on the support base to be aligned to possess oblique orientation and crosslinked.

12. A liquid crystal display device, comprising:
   a liquid crystal display element including a liquid crystal layer sandwiched by a pair of light-transmitting substrates each having an electrode layer provided thereon;
   a pair of polarizers disposed so as to sandwich said liquid crystal display element; and
   at least one phase difference plate, each said phase difference plate defining a surface and being disposed between said liquid crystal display element and said pair of polarizers,
   wherein the improvement comprises (i) each of said at least one phase difference plate having three principal refractive indices $n_a$, $n_b$, and $n_c$ being mutually related by the inequality $n_a<n_b<n_c$, the direction of the principal refractive index $n_a$ coinciding with the direction of a y-coordinate axis among x and y-coordinate axes on each said surface of said at least one phase difference plate, the y-coordinate axis being orthogonal to said normal, and the direction of the principal refractive index $n_b$ inclining relative to the normal to said surface and to the direction of said x-coordinate axis, and, (ii) the refractive index anisotropy $\Delta n$ (550) of the liquid crystal material for rays of light having the wavelength of 550 nm being specified to be more than 0.060 and less than 0.120, (iii) $\Delta n$ (450)–$\Delta n$ (650), i.e., the difference between the refractive index anisotropy $\Delta n$ (450) of the liquid crystal material for rays of light having a wavelength of 450 nm and the refractive index anisotropy $\Delta n$ (650) thereof for rays of light having the wavelength of 650 nm, being specified to be not less than 0.0070 and not more than 0.0250, and (iv) the refractive index anisotropy of said liquid crystal material being specified to vary with other wavelengths of rays of light within a range that allows substantially no viewing-angle dependent coloration to occur on a displayed image.

13. A liquid crystal display device, comprising:
   a liquid crystal display element including:
      a pair of substrates,
      a liquid crystal layer sandwiched between said substrates;
   a pair of polarizers disposed so as to sandwich said liquid crystal display element; and at least one phase difference plate, each said at least one phase difference plate defining a surface and being disposed between said liquid crystal display element and said pair of polarizers, wherein (i) each of said at least one phase difference plate has three principal refractive indices $n_a$, $n_b$, and $n_c$ being mutually related by the inequality $n_a<n_b<n_c$, (ii) the direction of the principal refractive index $n_a$ coincides with the direction of a y-coordinate axis among x and y-coordinate axes on each said surface of said at least one phase difference plate, the y-coordinate axis being orthogonal to said normal, and (iv) the direction of the principal refractive index $n_b$ inclines relative to the normal to said surface and to the direction of said x-coordinate axis;

wherein $\Delta n$ (450)–$\Delta n$ (650), i.e., the difference between the refractive index anisotropy $\Delta n$ (450) of the liquid crystal material for rays of light having a wavelength of 450 nm and the refractive index anisotropy $\Delta n$ (650) thereof for rays of light having the wavelength of 650 nm, is specified to be not less than 0.0070 and not more than 0.0250, and wherein the refractive index anisotropy of said liquid crystal material varies with other wavelengths of rays of light within a range that allows substantially no viewing angle dependent coloration to occur in an image displayed by said device.

14. The liquid crystal display device as defined in claim 13, wherein the refractive index anisotropy $\Delta n$ (550) of the liquid crystal material for rays of light having the wavelength of 550 nm is specified to be more than 0.060 and less than 0.120.

15. The liquid crystal display device as defined in claim 14, wherein the refractive index anisotropy $\Delta n$ (550) of the liquid crystal material for rays of light having the wavelength of 550 nm is specified to be not less than 0.065 and smaller than 0.115.

16. The liquid crystal display device as defined in claim 13, wherein the refractive index anisotropy $\Delta n$ (550) is specified to be not less than 0.065 and not more than 0.115.

17. The liquid crystal display device as defined in claim 13, wherein the refractive index anisotropy $\Delta n$ (550) is specified to be not less than 0.070 and not more than 0.095.

18. The liquid crystal display device as defined in claim 13, wherein $\Delta n$ (450)–$\Delta n$ (650) is specified to be not less than 0.0200 and not more than 0.0250.

19. The liquid crystal display device as defined in claim 15, wherein the refractive index anisotropy $\Delta n$ (550) is specified to be not less than 0.070 and not more than 0.095.

20. The liquid crystal display as defined in claim 13, wherein the inclination angle of the principal refractive index $n_b$ of the phase difference plate is specified to be in the range from 15° to 75°.

* * * * *